(12) United States Patent
Cao et al.

(10) Patent No.: US 12,407,455 B2
(45) Date of Patent: Sep. 2, 2025

(54) DEVICES AND METHODS OF SIGNALING FOR RESOURCE SELECTION AND RESERVATION IN SIDELINK TRANSMISSION

(71) Applicants: Yu Cao, Kanata (CA); Amine Maaref, Kanata (CA); Jianglei Ma, Kanata (CA)

(72) Inventors: Yu Cao, Kanata (CA); Amine Maaref, Kanata (CA); Jianglei Ma, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/615,223

(22) Filed: Mar. 25, 2024

(65) Prior Publication Data
US 2024/0313909 A1    Sep. 19, 2024

Related U.S. Application Data

(63) Continuation of application No. 17/027,885, filed on Sep. 22, 2020, now Pat. No. 11,943,067.

(Continued)

(51) Int. Cl.
*H04L 1/1867* (2023.01)
*H04L 5/00* (2006.01)
*H04W 72/21* (2023.01)

(52) U.S. Cl.
CPC ......... *H04L 1/1893* (2013.01); *H04L 1/1896* (2013.01); *H04L 5/0005* (2013.01); *H04W 72/21* (2023.01)

(58) Field of Classification Search
CPC . H04W 72/0413; H04W 72/21; H04W 72/25; H04W 72/40; H04L 1/1893; H04L 1/1896; H04L 5/0005
See application file for complete search history.

(56) References Cited

U.S. PATENT DOCUMENTS

2018/0213438 A1* 7/2018 Muraoka ............... H04W 72/04
2019/0029029 A1* 1/2019 Ohtsuji ................. H04W 4/023
(Continued)

FOREIGN PATENT DOCUMENTS

CN    109691146 A    4/2019
CN    109792594 A    5/2019
(Continued)

OTHER PUBLICATIONS

R1-1908901, "Discussion on resource allocation for NR sidelink Mode 1", LG Electronics, 3GPP TSG RAN WG1 #98 Meeting, Prague, Aug. 26-30, 2019, pp. 1-8.
(Continued)

*Primary Examiner* — Kent Krueger

(57) ABSTRACT

A first user equipment (UE) is configured to receive from a base station a signaling comprising indication of one or more time-frequency resources and an indicator indicating a time gap, and transmit a transport block (TB) to a second UE using the one or more time-frequency resources. For each of the time-frequency resources, the first UE monitors a hybrid automatic repeat request (HARQ) feedback from the second UE, using a physical sidelink feedback channel (PSFCH) resource; and transmits to the base station a HARQ feedback report signal based on the HARQ feedback or absence thereof, in a physical uplink control channel (PUCCH), using a single PUCCH resource determined based on the time gap from a last one of the PSFCH resources.

32 Claims, 10 Drawing Sheets

Related U.S. Application Data

(60) Provisional application No. 62/911,208, filed on Oct. 4, 2019.

(56) References Cited

U.S. PATENT DOCUMENTS

| | | | |
|---|---|---|---|
| 2019/0223231 A1* | 7/2019 | Muraoka | H04W 76/11 |
| 2019/0356400 A1* | 11/2019 | Muraoka | H04B 17/318 |
| 2020/0128527 A1* | 4/2020 | Muraoka | H04W 72/51 |
| 2020/0296738 A1* | 9/2020 | Inokuchi | H04W 72/21 |
| 2020/0296745 A1* | 9/2020 | Inokuchi | H04W 72/566 |
| 2020/0305165 A1* | 9/2020 | Inokuchi | H04W 88/04 |
| 2020/0322095 A1 | 10/2020 | Park et al. | |
| 2021/0050950 A1 | 2/2021 | Zhou et al. | |
| 2021/0377989 A1 | 12/2021 | Chae et al. | |
| 2022/0078753 A1 | 3/2022 | Park et al. | |
| 2022/0140956 A1 | 5/2022 | Park et al. | |
| 2022/0150872 A1 | 5/2022 | Park et al. | |
| 2022/0183002 A1 | 6/2022 | Yeo et al. | |
| 2022/0191847 A1 | 6/2022 | Hong et al. | |

FOREIGN PATENT DOCUMENTS

| | | |
|---|---|---|
| EP | 3993298 A1 | 5/2022 |
| WO | 2018080561 A1 | 5/2018 |

OTHER PUBLICATIONS

TCL Communication, "Physical Layer Procedures for Sidelink", 3GPP TSG RAN WG1 Meeting #97, R1-1907051, Reno, US, May 12, 2019, total 10 pages.

R1-1909315, Huawei et al., "NR DCI and UCI design for resource allocation mode 1", 3GPP TSG RAN WG1 Meeting #98, Prague, Czech Republic, Aug. 26-30, 2019, 7 pages.

R1-1909797, Ericsson, "Feature lead summary#2 on Resource allocation for NR sidelink Mode 1", 3GPP TSG-RAN WG1 Meeting #98, Prague, Czech Republic, Aug. 26-30, 2019, 35 pages.

* cited by examiner

DEVICES AND METHODS OF SIGNALING FOR RESOURCE SELECTION AND RESERVATION IN SIDELINK TRANSMISSION

RELATED APPLICATION

This application is a continuation of U.S. patent application Ser. No. 17/027,885 filed on Sep. 22, 2020, which claims the benefit of priority of U.S. Provisional Patent Application No. 62/911,208 filed on Oct. 4, 2019, the contents of which are incorporated by reference herein in their entirety.

TECHNICAL FIELD

The present disclosure relates generally to wireless communications, and in particular embodiments, to devices and methods of signaling and resource allocation for sidelink (SL) transmissions.

BACKGROUND

In some wireless communication systems, user equipments (UEs) wirelessly communicate with a base station (BS) to send data to the BS or receive data from the BS. A wireless communication from a UE to a BS is referred to as an uplink (UL) communication. A wireless communication from a BS to a UE is referred to as a downlink (DL) communication. A wireless communication from a first UE to a second UE is referred to as a sidelink (SL) communication or a device-to-device (D2D) communication.

Resources are required to perform uplink, downlink and sidelink communications. For example, a BS may wirelessly transmit data, such as a transport block (TB), to a UE in a DL transmission at a particular frequency and over a particular duration of time. The frequency and time duration used are examples of resources.

Vehicle to everything (V2X) refers to a category of communications scenarios that can include, among other things, communication between a vehicle and another vehicle (V2V), vehicle to infrastructure (V2I), vehicle to pedestrian (V2P), vehicle to network (V2N) and other scenarios. In V2X, the transmission can be done through a link between a network and a UE, such as UL and DL, or through a SL between UEs. UE cooperation can be used to improve latency, reliability, throughput, coverage and capacity of V2X communications, as well as next generation wireless communications in general. For example, UE cooperation could be used to provide diversity in space, time and frequency, and increase robustness against fading and interference. In UE cooperation, SL communications could be used for data forwarding, where some of the UEs, referred to as cooperating UEs (CUEs), act as relays for other UEs, referred to as target UEs (TUEs), to improve system throughput and coverage.

Current Long Term Evolution (LTE) standards define an LTE V2X transmission scheme that relies on the concept of a transmitting and receiving resource pool (RP). A resource pool includes a set of time-frequency resources which can be contiguous or non-contiguous in time or frequency, or in both. The resource pool may consist of sub-channels. A sub-channel consists of a group of contiguous resource blocks (RBs) in a same subframe. The current LTE V2X transmission scheme includes two transmission modes: mode 3 and mode 4. In mode 3, a BS schedules time-frequency resources (from the UE's resource pool) for SL transmission using downlink control information (DCI), either dynamically or semi-persistently. In mode 4, a UE randomly selects resources within its transmit RP. The UE may also reselect resources based on previous measurement and sensing results.

The conventional resource pool approach specified by the current LTE V2X transmission scheme has drawbacks and limitations. For example, the design of LTE mode 4 relies on sensing and reservation to avoid collisions or resource conflicts between autonomous UE transmissions, and therefore does not efficiently exploit radio resources. Additionally, LTE mode 4 is mainly targeted to handle periodic traffic and may be suboptimal for aperiodic traffic.

New V2X schemes are being developed. For example, the third Generation Partnership Project (3GPP) is developing New Radio (NR) V2X standards. Two SL transmission modes, mode 1 and mode 2, have been proposed for NR V2X.

In NR V2X SL mode 1, the BS controls SL transmission by the UEs. NR V2X SL Mode 1 includes dynamic scheduling and SL configured grant transmission. SL Configured grant (CG) transmission includes a Type 1 SL configured grant transmission where the configured grant is signaled in radio resource control (RRC) signaling, and a Type 2 SL configured grant transmission where the resource for configured grant transmission is signaled in a combination of RRC and DCI signaling.

In proposed NR V2X SL mode 2, the UE performs sensing and autonomously selects a resource from a set of candidate resources that are included in a configured or preconfigured resource pool. The proposed Mode 2 grant free (GF) transmission scheme includes a sensing procedure performed at a UE that may use sidelink control information (SCI) sent over a physical sidelink control channel (PSCCH) by another UE, or physical sidelink shared channel (PSSCH) measurements; and a selection procedure that uses results of the sensing procedure to determine resources for SL transmission. However, many details of the proposed sensing and resource selection scheme are currently undeveloped and have been designated as topics for further study.

Sidelink (SL) communication between user equipments (UEs) presents some possible challenges.

Accordingly, new techniques of resource selection and reservation for SL transmissions based on sensed information are desired, including methods and systems that can mitigate against inefficient use of time-frequency resources in the SL resource pool, and thus improve the efficiency of data transmissions between UEs, particularly in V2X transmissions.

SUMMARY

It has been recognized that a need still exists for more efficient utilization of communication resources for SL communication, which may be achieved by improved procedures for signaling and allocation of the recourses including time-frequency resources.

According to one aspect of the present disclosure, there is provided a method comprising: receiving, at a first user equipment (UE) from a base station, a signaling comprising indication of one or more time-frequency resources and an indicator indicating a time gap; transmitting a transport block (TB) from the first UE to a second UE using the one or more time-frequency resources; for each of the one or more time-frequency resources, monitoring, at the first UE, a hybrid automatic repeat request (HARQ) feedback from the second UE, using a physical sidelink feedback channel (PSFCH) resource; transmitting, from the first UE to the base station, a HARQ feedback report signal based on the HARQ feedback or absence thereof, in a physical uplink control channel (PUCCH), using a single PUCCH resource determined based on the time gap from a last one of the PSFCH resources.

In another aspect, there is provided a method comprising: transmitting, from a base station to a first UE, a signaling comprising indication of one or more time-frequency resources for transmitting a transport block (TB), each one of the one or more time-frequency resources associated with a physical sidelink feedback channel (PSFCH) resource for receiving a hybrid automatic repeat request (HARQ) at the first UE, the signaling further comprising an indicator indicating a time gap between a last one of the PSFCH resources and a physical uplink control channel (PUCCH) resource; receiving, at the base station, from the first UE, a HARQ feedback report signal based on the HARQ feedback or absence thereof, in a PUCCH, using the PUCCH resource.

In the methods of the preceding two paragraphs, the one or more time-frequency resources may be a plurality of time-frequency resources. Each one of the plurality of time-frequency resources may be associated with one of the PSFCH resources. The one or more time-frequency resources may be scheduled dynamically by the base station, and the signaling may comprise downlink control information (DCI) signaling. The one or more time-frequency resources may be configured for configured grant with a periodicity by the base station. The signaling may comprise radio resource control (RRC) signaling and the RRC signaling may comprise the indication of the one or more time-frequency resources and the indicator of the time gap. The resource configuration for configured grant may be signaled in radio resource control (RRC) signaling and downlink control information (DCI) signaling. The HARQ feedback report signal may be a single bit in a PUCCH transmission. Transmission of a TB from a first UE to a second UE may comprise an initial transmission or a retransmission of the TB, and each of the one or more time-frequency resources may be used for the initial transmission or a retransmission of the TB.

In a further aspect, there is provided a user equipment comprising a transceiver and a processor, and the user equipment is configured to perform a method described herein.

In another aspect, there is provided a base station comprising a transceiver and a processor, and the base station is configured to perform a method described herein.

In a further aspect, there is provided an apparatus comprising an antenna; a processor; and a non-transitory computer readable storage medium storing processor executable instructions for execution by the processor, the processor executable instructions including instructions causing the apparatus to perform a method described herein.

In another aspect, there is provided an apparatus comprising an antenna; a processor; and a non-transitory computer readable storage medium storing processor executable instructions for execution by the processor, the processor executable instructions including instructions causing the apparatus to perform a method described herein.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

Similar reference numerals may have been used in different figures to denote similar components.

DETAILED DESCRIPTION OF ILLUSTRATIVE EMBODIMENTS

Figure 1A:
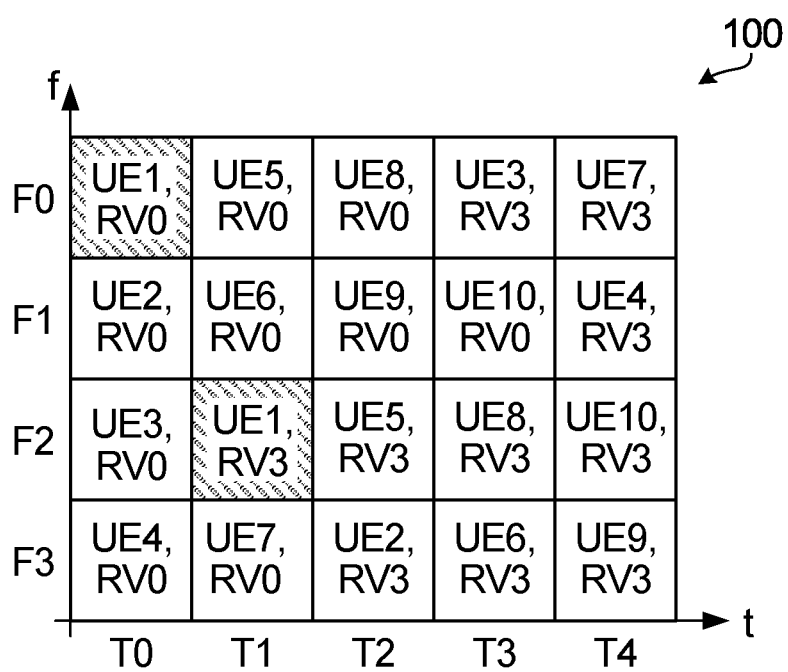
FIG. 1A is a block diagram illustrating an example of a two-dimensional resource configuration for SL transmission, in which embodiments of the disclosure may occur.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Example embodiments described herein may be applied to, among other things, NR V2X SL communications.

In some V2X scenarios, such as NR V2X mode 2, SL resource allocation is based on sensing and resource selection procedures. In NR V2X mode 2 transmission, a UE may autonomously select SL resources for SL transmission within configured or preconfigured resource pools (RPs) or within pre-configured resources within RPs. However, because NR requires high reliability and may include multiple repetitions, potential SL transmission collisions between the transmissions of multiple UEs may arise when a UE selects SL transmission resources that may be reserved by the other UEs, which may cause lower reliability and higher latency.

Accordingly, the present disclosure relates to methods, devices or apparatus for sensing and indicating information for selection and reservation of communication resources for SL communication, and selecting and reserving communication resources based on at least in part such indications.

It has been recognized that resource selection for reservation may be made at least in part based on the type of the reservation to be made for transmitting a transport block (TB). It can be appreciated, and will be explained in more detail below, that depending on the reservation type, the probability that the reserved resources will be actually used to transmit a later TB can vary. Reservations of resources with a higher probability of utilization in a future transmission should be given a higher priority to be excluded from the available resource set or resource pool for a further selection. In one implementation, the threshold for excluding these types of reservations from further selection should be low.

Therefore, it would facilitate efficient selection and reservation of resources to determine reservation priorities or exclusion thresholds for different the resources and resource reservations, and select and reserve a particular resource based at least in part on the associated reservation priority or exclusion threshold.

In this regard, it has been further recognized that it would be convenient if the reservation type information is readily accessible and available during SL communication. For example, the reservation type information may be indicated in a reservation signal, particularly, an indication signal, transmitted from a first UE to other UEs for reservation of SL communication resources, such as time-frequency resources in SL communication between different UEs. The indication signal may be a sidelink control indicator, also commonly referred to as sidelink control information (SCI), which is usually transmitted through a SL control channel (SCC), for example, the physical sidelink control channel (PSCCH). The first UE may be a transmitting UE that is transmitting the TB to the second UE or another UE. The second UE may be a sensing UE that is sensing the transmitted signal and TB. The second UE, or a sensing UE, may also be a receiving UE or target UE, which is the desired final recipient of transmitted TB. A sensing UE may perform sensing by decoding indication signals including SCI transmitted by the first UE even if the data associated with the SCI is not intended to be received by the sensing UE. The sensing UE may need to select and reserve communication resources for receiving and transmitting relevant data based on the sensed information. Therefore, even though it may not be necessary for the sensing UE to decode the transmitted data packet or TB entirely, the sensing UE may still need to obtain certain information for processing the received data.

For NR V2X SL communication, it has been agreed that the SCI is a 2-stage indication signal. In one embodiment, the reservation type information is indicated in the first stage SCI, because it is then sufficient for a sensing UE to decode only the first stage SCI to obtain the needed information for selection and reservation of the time-frequency resources.

Accordingly, in a particular embodiment, a process for sensing and indicating information for selection and reservation of resources includes generating, at a first UE, a first stage SCI which includes an indicator that indicates the reservation type of the reservation of time-frequency resources for communicating a transport block (TB) between UEs through SL communication; and transmitting an indication signal including the first stage SCI to a second UE.

In a further embodiment, a process performed at the second UE includes receiving from the first UE the indication signal, and selecting and reserving time-frequency resources based on at least in part the reservation type indicated by the indication signal.

Depending on the nature of the particular TB to be transmitted and the reservation types, the indication signal including the SCI may contain other indicators or information.

For example, for transmission of different TBs, the first stage SCI may include information indicating the reservation period (RSVP), and information indicating a reservation type. The reservation type may be indicated explicitly or implicitly. For example, the reservation type may be implicitly indicated by information specifying or indicating a functionality of a specific type of reservation. The reservation type may also be implicitly indicated by information specifying or indicating specific actions to be performed by the UE in association with the specific type of reservation. The reservation type may be selected from at least the following reservation types:

Long-term reservation similar to LTE V2X reservation

No resource reservation for a different TB

Reservation of a fixed number of resources for different TBs.

For transmission (including retransmission) of the same TB, the first stage SCI may include the following information:

Whether the reserved retransmission is a blind retransmission or a HARQ feedback based retransmission.

The number of retransmission resources reserved (including the current transmission)

Time and frequency resources for all transmission/retransmission resources reserved (including the current transmission), or time-frequency resource pattern (TFRP) index among the pool of (pre)configured TFRPs.

Optionally, retransmission index j, where j=[0, 1, . . . , K−1] refers to the index of the number of transmissions of the TB starting with index 0.

In different embodiments, the sensing UE may use the information in SCI to allocate, select and reserve resources. In some embodiments, there may be two stage SCI. In the case of two stage SCI, the first stage SCI is usually for the purpose of indicating sensing information and scheduling the resource for the second stage SCI. By this design, the sensing UEs that are not the target receivers of the data only need to decode the first stage SCI for sensing and resource selection purposes. For the receiver UE that is the intend recipient of the data, the receiving UE can further decode the second stage SCI using information obtained from first stage SCI. The second stage SCI may contain any further information that is required for decoding the data that may not be present in the first stage SCI. Therefore, the receiving UE can further decode the data after decoding the second stage SCI. By this design, the first stage SCI can be made in smaller size. The first stage SCI is usually transmitted in the PSCCH. For this reason, the sensing and reservation information described in this disclosure is usually included in the first stage SCI if the two stage SCI design is used.

For example, for reservation of retransmission resources/TFRPs with possible different number of retransmissions, the following options are available. Details of how to indicate reservation of retransmission resources are further discussed below.

In a first option, the first stage SCI may indicate the number of retransmissions reserved and a TFRP index for a given number of retransmissions.

In a second option, the TFRP pool already includes TFRPs with different number of retransmissions, in which case the first stage SCI may indicate only a TFRP index.

In a third option, the first stage SCI indicates the number of retransmission(s) reserved, a time domain slot pattern indication, and a frequency domain subchannel based hopping offset.

In a fourth option, the first stage SCI indicates the TFRP for 2 transmissions. The 2 transmission patterns may be either repeated or concatenated by a number of times to achieve multiples of 2-transmission patterns, such as 4 transmissions.

In an example embodiment of the disclosure, the indication signal associated with reservation of time-frequency resources for a given TB indicates a reservation type selected from three possible types, which are supported by the particular network used for the SL communication. The three types of reservation includes: (a) reservation of a sidelink resource for transmission of a TB via signaling associated with a prior transmission of a different TB; (b) reservation of a sidelink resource for blind retransmission of a TB via signaling associated with a prior transmission of the same TB; (c) reservation of a sidelink resource for hybrid automatic repeat request (HARQ)-feedback based retransmission of a TB via signaling associated with a prior transmission of the same TB.

An example of sensing using reservation Type (a) is similar to LTE long term sensing. Reservation Types (b) and (c) are supported in NR. In a selection process according to an embodiment herein, a sensing UE determines a resource selection window, and then selects the resources within the resource selection window. The selection is made with an aim to avoid conflict between resources reserved under Type (a) reservation or transmission/retransmission resources indicated by other UEs under Type (b) or (c) reservations.

Type (a) reservation may further include the following sub-types:
  Sub-type (a1)—long-term reservation, similar to LTE V2X;
  Sub-type (a2)—reservation of a fixed number of periodic resources (e.g., for later transmission of different TBs); and
  Sub-type (a3)—no reservation of periodic resources.

The HARQ mechanism is a link adaptation technique that can reduce the error rate of data packets in wireless communication networks. The HARQ feedback includes a HARQ acknowledgement (ACK, or HARQ-ACK), or negative ACK (NACK). Typically, when a receiving UE successfully decodes a received data packet, the receiving UE may transmit a HARQ ACK to the transmitting UE or the source of the packet. If a packet is not successfully received and decoded within a certain time period or a certain number of transmission attempts, the receiving UE may transmit a NACK to the transmitting UE.

To indicate the reservation information of different reservation types for the sensing UE to perform resource selection, at least the following signaling should be indicated in the SCI, particularly in the first stage SCI if two stage SCI is used:
  the priority of the data packets, or quality of service (QOS) priority, that will be used for resource selection,
  time frequency resources of the reserved transmission/retransmission,
  reservation periodicity (RSVP), or TFRP periodicity, and number of periodic resources, m, explicitly reserved based on RSVP.

In some embodiment, RSVP may be predefined or (pre)configured and does not need to be explicitly indicated in SCI. For example, RSVP can be (pre)configured in a resource pool configuration. In some embodiments, m=0 may indicate no reservation for periodic resource, m=infinite or unknown may indicate long term reservation similar to LTE V2X (or reservation of an unknown number of periodic resources), m=other positive integer among possible choices indicates reservation of a specific number of periodic resources for different TBs. In some other embodiments, there may be a separate bit to indicate whether there is a periodic reservation. In this case, the option of m=0 is not needed for this purpose and can be reserved or used for a different indication.

The time frequency resources may include slots and sub-channels of the initial transmission and retransmission resources for a TB. This field is used for reservation of the transmission/retransmission of the same TB as the current SL data transmission associated with the SCI. This field may be further used for decoding the data by the receiver UE.

In networks supporting or requiring 2-stage SCI, the above signaling or indication information can be indicated in the first stage SCI. A convenient benefit of indicating the above information including the reservation type in the first stage SCI is that a sensing UE other than the target UE or receiving US does not need to decode the second stage SCI for sensing purpose.

In LTE V2X, no field is provided in the SCI to indicate the number of resources explicitly reserved based on the RSVP or whether the periodic reservation is enabled or not. The reason is that LTE V2X is mainly targeting periodic traffic, and every UE performs semi-persistent periodic transmission, for which the reservation can be considered as a long-term reservation or reserving an infinite or an a priori unknown number of resources because the transmitting UE (Tx UE) will use the periodic resource until a resource reselection is triggered.

It is expected that in NR-V2X, data transmission may be aperiodic and involve data traffic with significant fluctuation and bursts of peak traffic periods. In some situations, the transmitting UE intends to perform a one-time transmission of a TB using a particular resource and does not intend to reserve the resource for any periodic transmission. In this situation, it may be beneficial for the transmitting UE to indicate the intention so that a sensing UE will not exclude the particular resource derived from current resource and reservation period from the set of available resources in a later time period.

If the transmitting UE has a large data packet to transmit, the UE can predict that the UE requires more than one resource for transmitting the packet. In this case, the UE can explicitly reserve a fixed number of periodic resources. Therefore, the SCI field indicating the number of explicitly reserved periodic resources can indicate either no periodic reservation, long-term reservation (or reservation of infinite or unknown amount of periodic resources) similar to LTE-V, or a specific number of explicitly reserved periodic resources. Alternatively, the SCI could contain one field indicating whether or not the resource reservation is for a periodic resource, and a separate field indicating the number of periods for which the resource is reserved. In another embodiment, the RSVP field may have a special value/choice that corresponds to no periodic reservation and no separate field is needed to indicate whether there is reservation of periodic resource (for a different TB than current transmission). Note that here reservation of resources for a different TB or future TB is used to distinguish reservation of resource for retransmission, which is the same TB of the current transmission.

In a further example, a one-time transmission is illustrated. In this example, the number (m) of periodic resources reserved is zero (0) or the bit to indicate whether a periodic resource is reserved is false. The process includes a one-time transmission of a small data packet. The transmitting UE may indicate that m=0, such that a sensing UE can determine the transmission is a one-time transmission and will not exclude the resource derived from this transmission and reservation period from further resource selection procedure.

As another example, in performing a sidelink transmission, when the transmitting UE receives a NACK after a maximum number of reserved retransmissions of a data packet, the transmitting UE can further reserve a retransmission resource for retransmitting the same data packet one more time, but does not need to reserve this resource for transmitting other and future TBs. In this case, the transmitting UE may indicate that there is no reservation for a future transmission of the same TB or a different TB.

In a typical resource selection procedure, when a resource selection or re-selection triggers, the UE collects all the sensing information during a sensing window and selects a resource among all candidate resources within a resource selection window based on the sensing results for its own transmission. The sensing window usually is defined a certain time window before the resource (re)selection triggers. Collecting sensing information includes decoding SCI (or other type of the reservation signal) of other UEs' transmissions and obtaining reservation information. If a UE decodes a SCI within the sensing window and a corresponding power/energy measurement of the transmission associated with the SCI is above a threshold, the corresponding reserved resource, if falls within the resource selection window, may be excluded from the candidate resources for resource selection to avoid collision. One typical example of such measurement is sidelink reference signal received power (SL-RSRP), which is usually measured based on PSSCH or PSCCH DMRS associated with the SCI that indicates the reservation.

An exclusion threshold Th may be used by a UE to exclude resources for selection from a resource pool (RP). Depending on the situation, the UE may increase or decrease the threshold such that less or more resources will be excluded during selection. For example, in an embodiment, when UE decodes a reservation signal in SCI within the sensing window and the SCI indicates a reserved resource, which is a potential candidate resource within the resource selection window. If the power/energy measurement associated with the reservation signal (e.g. SCI), such as the side link reference signal received power (SL-RSRP), exceeds the determined exclusion threshold, such as when SL-RSRP>Th and the number of other UEs sensed using that candidate resource is larger than a threshold number L, where L can be 0, 1, 2 . . . , the potential candidate resource can be excluded from the candidate resource set/pool for selecting a resource for its own transmission by the sensing UE. In some embodiments, the number of L may not need to be taken into account for resource exclusion, and only the RSRP value and the threshold (Th) are taken into account. It can be understood that the lower the exclusion threshold (Th), the more likely a potential candidate resource will be excluded from the candidate resource set. Thus, a reservation of resources with a higher priority from the perspective of the sensing UE should be associated with a lower threshold, so that the resource will be more likely excluded from selection of resources for other transmissions. The threshold can be determined at least based on the packet or QoS priority in the decoded SCI for reservation and the packet or QoS priority of its own transmission, through a mapping table or other rules. See Tables 1 and 2 and associated discussions below.

In a further embodiment, the reservation type is used to set or adjust an exclusion threshold (Th). For example, the SL reference signal received power (SL-RSRP) threshold is a function of at least the priority of the SL transmission indicated in the received SCI and the priority of the transmission for which resources are being selected by the UE. The threshold may be further adjusted based on the different reservation types/sub-types described in this disclosure. Alternatively, the priority value used to find the threshold for resource selection may be adjusted based on the reservation type.

For determining the reserved resource for different types of reservations, the reservation information included in an SCI may specify that a particular time-frequency resource, e.g. $(t_0, f_1)$, within a RP is to be reserved. In another embodiment, the reserved resource may be determined based on periodic reservations. For example, with regard to determining the time frequency location of reserved resource by reservation type a1, a2 and a3, the following example of determining the location of reserved resource can be used: For long term reservation or type a1 reservation, if the time frequency location for the current transmission associated with the SCI is $(t_0, f_0)$, then periodic resources $(t_0+n \times RSVP, f_0)$ (n is any positive integer) are considered to be reserved resources. For reservation type a2 which reserves a fixed number (m) of periodic resources, the resource at time frequency location $(t_0+n \times RSVP, f_0)$, where $(1 <= n <= m)$ are considered to be reserved resources; for type a3 reservation where no periodic resource is reserved, $(t_0+n \times RSVP, f_0)$ is not considered a reserved resource.

When different types of reservations are possible, the priority or threshold may be set or adjusted in view of the reservation type.

Different reservation types may have different impacts on the resource selection and reservation. For example, for Sub-type (a1) reservation, the UE that reserves periodic resources based on long term reservation may not actually use a reserved resource during the resource selection window of the sensing UE simply because the UE may not have a packet to transmit or the UE has performed a resource (re)selection before using the reserved resource. For Sub-type (a3), there is no reservation of resources. Therefore, the reserved resource based on RSVP is still treated as being available for use. For type (b) reservation, the UE that reserves a resource for blind retransmission is highly likely to use the reserved retransmission resource. Similarly, when the UE reserves a fixed number of resources for different TBs under Sub-type (a2), the UE is very likely to use those resources. For Type (c) reservation, the UE which makes the reservation for HARQ-feedback based retransmission may release the retransmission resource due to receiving an ACK before the retransmission. Therefore, in general, Type (b) and Sub-type (a2) reservations should be assigned or associated with or adjust to a higher priority or choose a lower RSRP threshold as compared to Type (a) and Type (c) reservations for the same packet priority. The adjustment of the priority can be implemented by applying a reservation type specific coefficient to the packet priority before using the priority value to determine the RSRP threshold.

Some embodiments disclosed herein relate to example methods for selecting resources based on different priority levels that are dependent on the types of resource reservations. Different priorities or priority adjustment value (e.g. priority coefficient that is described in more detail later) are assigned to resource reservations based on the types of transmissions that the reservation is being made in respect of. For example, priority levels may be respectively assigned to the following types of resource reservations: (a1) long term resource reservation for future transmission of different transport blocks (TBs); (a2) resource reservation for future transmission of an explicitly specified number of TBs; (b) resource reservation for blind retransmission; (c) resource reservation for feedback-based retransmission; and (d) resource reservation for an initial transmission of a TB using a standalone advance control signal preceding initial transmission of the TB. In example embodiments, the respective priority levels associated with each type of resource reservation are configured or preconfigured or predefined. A UE requesting a resource reservation can transmit a priority indicator that identifies the priority value of the resource reservation that the UE is requesting. Other UEs can sense the priorities and make resource selections for their own transmissions based on the sensed priorities.

At least for unicast, a HARQ feedback can be supported for SL transmissions. In the case of HARQ feedback based SL retransmission, the receiving UE (Rx UE) can adjust its behavior on whether or not to expect a retransmission based on the HARQ feedback. For the sensing UE (other UE), its resource selection scheme should lower the priority of a reservation if the reserved resource can be released. This can be achieved by adjusting the priority level by multiplying it with a coefficient less than one if there is a chance the reserved resource may be released based on HARQ feedback.

In some example embodiments disclosed herein, different priorities are associated with different reservation types which reflect different reservation mechanisms.

In some example embodiments disclosed here, a sensing UE adjusts the priority associated with a reservation of HARQ-feedback based retransmission to be lower than the reservation of blind retransmission for the purpose of resource selection or reselection.

In some example embodiments disclosed here, for the purpose of resource selection or reselection, a sensing UE adjusts the priority associated with a long-term reservation, or Type (a1) reservation, for an a priori unknown number of different TBs to be lower than that for the reservation of resources for a fixed number of resources for different TBs, or a type (a2) reservation.

The indication of the reservation type in the SCI allows the sensing UE to conveniently identify the reservation type. By adjusting the priority and mapping the priority or reservation type to a different threshold, e.g., a RSRP threshold, for resource selection, the sensing UE can exclude resources more accurately for resource selection, and the overall resource utilization efficiency and system performance can be improved.

In some embodiments, various options may be provided for indicating retransmission resources to be reserved where the number of retransmissions K can have different possible values. Note the number of retransmissions K may be defined to include the current transmission or it can be defined as the number of retransmissions excluding the current transmission. The definition results in a difference of 1 for the value of K and is otherwise equivalent. For notational simplicity and without loss of generality, we assume the number of retransmissions or repetitions K includes the initial transmission, but the same method would apply for indicating K that does not include the initial transmission.

In one embodiment, the SCI (or first stage SCI for a two stage SCI design) optionally includes an indicator indicating the number of retransmissions for which resources are to be reserved, and an indicator indicating the TFRP index for the given number of retransmissions.

In another embodiment, if the available TFRP pool of the sensing UE already includes TFRPs associated with different number of retransmissions, the SCI or first stage SCI may optionally include only the TFRP index. In this case, the TFRP index would be sufficient for the sensing UE to select the appropriate TFRPs.

In a further embodiment, the first stage SCI may include indication information for indicating the TFRP for two (2) retransmissions. When four (4) retransmissions are required, the resource pattern for a 4-retransmission may be formed by repeatedly applying the indicated TFRP for 2-retransmission to each subsequent pair of retransmissions. To illustrate with reference to FIG. 1A and FIG. 3 supposing the indicated TFRP for the 2-retransmission is pattern UE1, which corresponds to (T0, F0) and (T1, F2) for the first 2 transmissions of the TB, then slot (T0+period, F0) and (T1+period, F2), or the same UE1 pattern of the next TFRP window is used for the last two transmissions of the TB among the 4 transmissions. Here period=5 slots for a TFRP pool indicated by FIG. 1. Alternatively, two different 2-retransmission TFRPs may be concatenated to form the resource pattern for a 4-retransmission. In this case two different indexes may be used to indicate the first 2 transmissions and last 2 transmissions. Supposing the first 2-retransmission TFRP is indicated as pattern UE1, which corresponds to (T0, F0) and (T1, F2) for the first 2 transmissions of the TB, and second 2 transmission TFRP is indicated as UE6, which corresponds to (T1+period, F1) and (T3+period, F3), the resource pattern for the 4-retransmission may be formed by combining UE1 pattern in the first TFRP window and UE6 pattern in the second TFRP window. The resource patterns for other multiples of 2 retransmissions may be formed similarly by repetition or concatenation. Similarly, if no explicit TFRP pool is defined, the resource indicated for the first 2 transmissions of a TB may be repeated or concatenated to form the resources of 4 transmissions of a TB.

In yet another embodiment, the SCI may indicate the number of retransmissions, and further include a time domain slot pattern indication and a frequency domain hopping information (such as subchannel based hopping offset).

For example, in cases where the available resources include a (pre)configured TFRP pool, the SCI may indicate the TFRP index for resource selection and reservation.

The various embodiments are further illustrated with the following detailed embodiments with reference to the drawings.

FIG. 1A illustrates a resource grid showing an example of two-dimensional resource configurations available for SL transmissions for different UEs, 10 UEs as depicted in FIG. 1A. The resource grid may be applied in NR V2X communications.

In an example embodiment, the resource grid of FIG. 1A represents transmission resources available in a physical sidelink shared channel (PSSCH). In this regard, the time-frequency resource grid of FIG. 1A represents a resource pool (RP) 100 that includes frequency-domain resources F0, F1, F2 and F3; and time-domain resources T0, T1, T2, T3 and T4. Each combination of frequency-domain resource and time-domain resource forms a transmission resource for an SL transmission. The RP 100 shown in FIG. 1A illustrates a pool of transmission resources that are potentially available for SL transmissions by different UEs within transmission pattern window. Each transmission resource represents a potential data transmission of a transport block (TB). In example embodiments, a UE may use multiple transmission resources based on a selection of one or more configured or preconfigured transmission patterns (e.g. time-frequency resource patterns (TFRPs) or time frequency repetition patterns) or based on a combination of multiple selected resource without explicitly defining a pool of TFRPs. In the case of UE1, the illustrated transmission pattern represented in FIG. 1A includes two time-frequency transmission resources (for example, T0/F0 and T1/F2, as indicated in crosshatch) that can be used by UE1 to transmit a TB. A redundancy version (RV) for each transmission resource is also shown (for example, RV0 or RV3). In FIG. 1A, the transmission pattern for UE 1 provides UE1 with communication resources to transmit a TB twice over the length of the transmission pattern window duration (for example a first retransmission of a TB followed by a second retransmission of the TB). Thus, the repetition number, K, for the transmission pattern for UE1 is 2. The grid of FIG. 1A illustrates ten respective transmission patterns, each of which includes two respective communication resources. Thus, RP 100 includes a pool of 10 transmission patterns, each of which includes 2 transmission resources. In some examples, K can be 1, or can be greater than 2.

As presented in FIG. 1A, the RP 100 has a frequency-domain length of 4 and a time-domain length of 5. In the time-domain, time durations T0 to T4 could be slots, mini-slots, symbols, or any other quantization or unit of time.

As can be appreciated, FIG. 1A illustrates a TFRP pool for two transmissions. "K" is used herein to denote the number of transmissions. For two (2) transmissions, K=2.

Figure 1B:
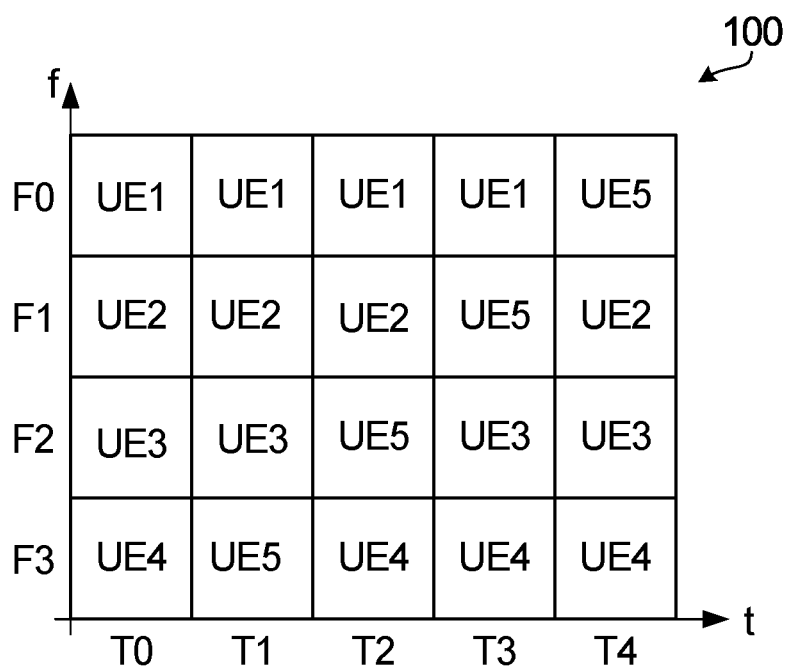
FIG. 1B is a block diagram illustrating a further example of a two-dimensional resource configuration for SL transmission, in which embodiments of the disclosure may occur.

Another example grid is shown in FIG. 1B, illustrating a TFRP pool for K=4. Unlike in FIG. 1A, the TFRP pool as depicted in FIG. 1B provides resources for only 5 UEs or 5 non-overlapping patterns, due to the increased number of possible retransmissions. The optional redundancy version (RV) is not indicated in FIG. 1B.

As discussed above, for a K=4 transmission, it is also possible to indicate the time frequency resources for the first two transmissions, and the indicated time frequency resources may be used again in a later period of the TFRP pattern for the last two transmissions as discussed earlier. Alternatively, the time frequency resources for the first two transmissions and the last two transmissions may be indicated separately using 2-tranmission resource patterns as discussed earlier.

In the frequency-domain, frequency durations F0 to F3 could be frequency sub-channels, combinations of sub-channels, resource blocks (RBs), resource block groups (RBGs), bandwidth parts (BWPs), subcarriers, groups of subcarriers, or any other quantization or unit of frequency. Furthermore, different frequency domain sub-channels are just an example. Sub-channels can instead be associated with different layers of non-orthogonal multiple access (NoMA), different pilot resources, and/or other resources. As described above, a transmission resource refers to at least time and frequency resources (e.g. a time duration and frequency bandwidth) to transmit a TB. In some other examples, the transmission resources could also or instead include code-domain resources (such as sparse code multiple access), space-domain resources, and/or different demodulation reference signals (DMRS). Moreover, the transmission resources are not limited to two-dimensions, and therefore could include a number of dimensions greater or less than two.

In example embodiments, each UE in a group of UEs may be configured with multiple transmission parameter sets or multiple configurations that form a candidate set of transmission parameter sets that the UE can select from for SL V2X transmissions. Each transmission parameter set may define: transmission resources (e.g. time/frequency location), periodicity, frequency sub-channel definition, DMRS/preamble, transmission pattern (e.g. TRFP), SCI location, modulation and coding scheme (MCS), repetition number K, hybrid automatic repeat request (HARQ) process related parameters, and feedback channel indicator, among other things. In some example embodiments, each transmission parameter set is associated with a DMRS that can be used to determine the other properties of the transmission parameter set, for example transmission resources. Accordingly, each UE can be configured or preconfigured with a pool of candidate transmission patterns.

In example embodiments, a SL communication may be established by performing a series of procedures that are configured for the UE to select communication resources that are not reserved by other UEs to transmit data, thereby mitigating against collisions. The series of procedures may include one or more of: a configuration procedure, a resource indication procedure, a sensing procedure, a resource selection procedure, and a transmission procedure, which will be described respectively in greater detail below.

Configuration Procedure

Regarding the configuration procedure, each UE (e.g., a single UE or each UE in a UE group 520 as described in greater detail below with reference to FIG. 5) may have a default initial transmission parameter set (e.g., defining initial transmission resources/patterns) or may otherwise be configured prior to transmitting a TB with an initial transmission parameter set to use for that TB. In some examples, each UE may be configured or preconfigured with an RP, such as an RP 100. The RP may be any resource pool with an explicit definition of preconfigured resource/repetition pattern pool. In an embodiment, the RP may include the transmission pattern pool shown in FIG. 1A. In the case of a TFRP pool, the initial transmission parameter set may include periodicity, length of a selection window, number of the repetition, size (e.g., time-domain length and frequency-domain length) of each resource for data transmission in the RP, etc. In some embodiments, the RP may be any pool of time frequency resources that is configured and can be used by a UE to perform SL transmissions. In some scenarios, there may be no explicit TFRP pool configured for a UE. The UE may select resources among a (pre)-configured RP for sidelink transmission. As noted above, in example embodiments different priority levels are associated with different types of resource reservations. In example embodiments, the UEs are configured or preconfigured with information that defines the relative priority levels for different types of resource reservations.

Figure 8:
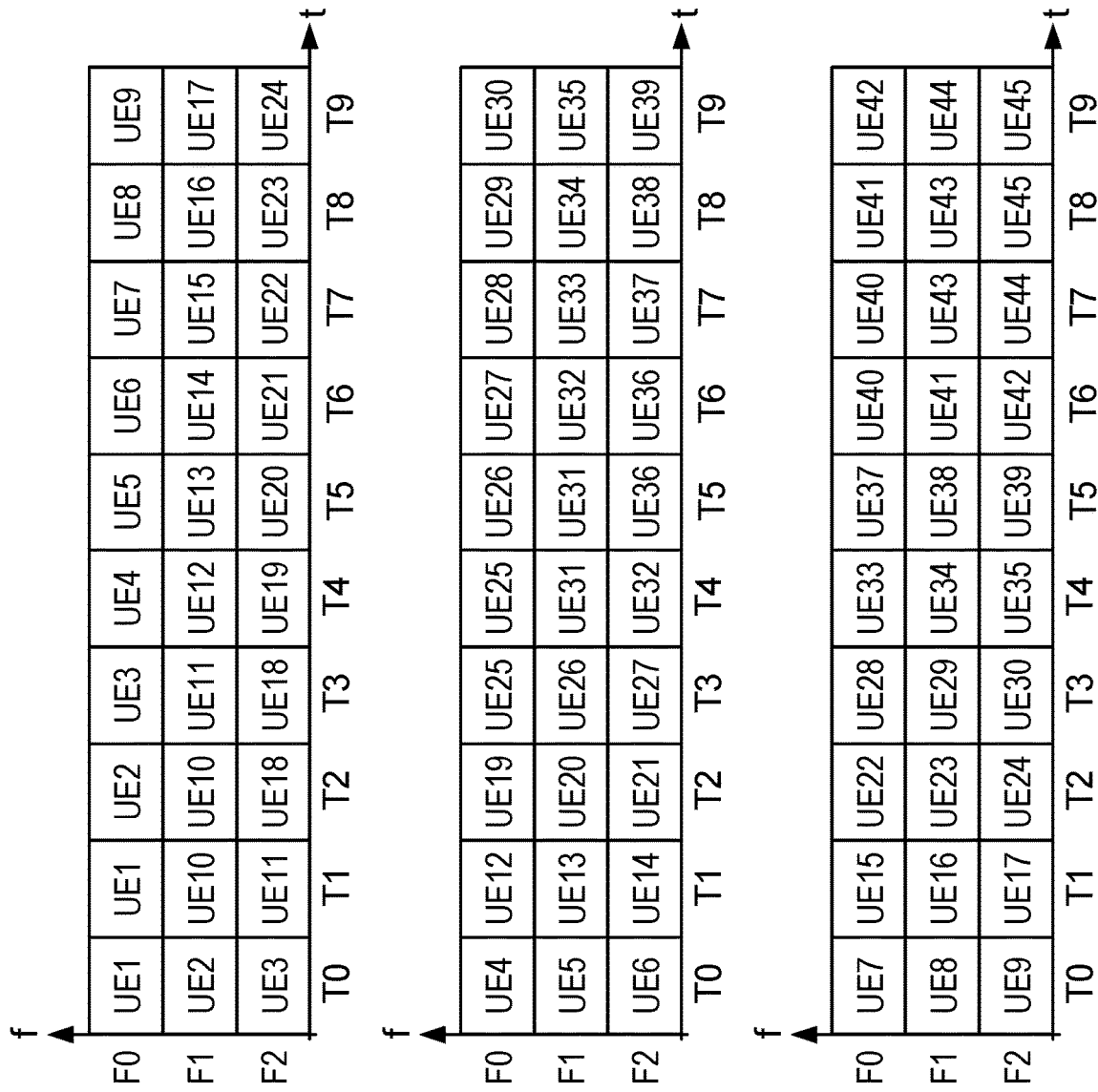
FIG. 8 is a schematic diagram illustrating an example of partially overlapping time-frequency resource pattern (TFRP) pool.

In some examples, during the configuration procedure, a UE is configured with a TFRP pool and possibly an initial/default TFRP. The TFRP pool configuration should include at least a periodicity and offset (starting slot). The TFRP pool can repeat itself in a non-overlapping way. An example of TFRP configuration can be a non-overlapping TFRP pool defined in FIG. 1A, which repeats itself every 5 slots (periodicity=5 slots) and offset is the starting slot number of the TFRP window/period, or a partially overlapping TFRP pool. In some examples, the partially overlapping TFRP pool may have a periodicity of 10 slots, as shown in FIG. 8. Because the TFRPs in this case are non-overlapped (or-thogonal), then in case flexible TFRP starting location is supported, only 1 bit of information carried by DMRS is needed to indicate whether the detected PSSCH corresponds to an initial transmission or a retransmission. In the case where TFRP pool is a partial overlapping TFRP pool, only 3 options (<2 bits) would need to be indicated by DMRS for sensing purposes because the location of PSSCH associated with the DMRS is already known. This can be done by setting a mapping relationship between the DMRS ports/sequences and the index of TFRPs that are partially over-lapping. Considering 8 DMRS ports are available based on NR Uu design which corresponds to 3 information bits, then 2 bits of DMRS port information can be used to indicate the TFRP pattern. If flexible starting location of repetition is supported, the remaining bit can be used to indicate whether the current transmission is an initial transmission or a retransmission.

In summary, a typical signaling for mode 2 TFRP opera-tion may include the following: (1) indication from (pre-) configuration as part of RP (pre)-configuration including Periodicity, Offset (starting slot), Number of repetitions, and Time Frequency allocation or TFRP pool. In some examples, the TFRP pool can also be derived based on pre-configured parameters in the RP, such as periodicity, offset, etc., accord-ing to some rules which are not part of the RP configuration. Information carried by DMRS port/sequence may include up to 2 bits for TFRP pattern indication (zero bits are needed in case of orthogonal TFRPs), 1 bit for re-transmission or initial transmission (zero bits are needed in case of a fixed TFRP starting position), 2 bits for MCS indication, 3 bits for quality of service (QOS) if QOS is indicated in the physical layer and not carried by SCI.

In case of no explicit TFRP pool configuration, the RP may at least indicate the division of subchannels in fre-quency domain (such as the starting location of $1^{st}$ subchan-nel, the number of available subchannels and the size of subchannel in terms of number of resource blocks per subchannel), and RP may also indicate the available time domain resources (e.g. which slots) that can be used by the UE that is configured with this RP.

Figure 5:
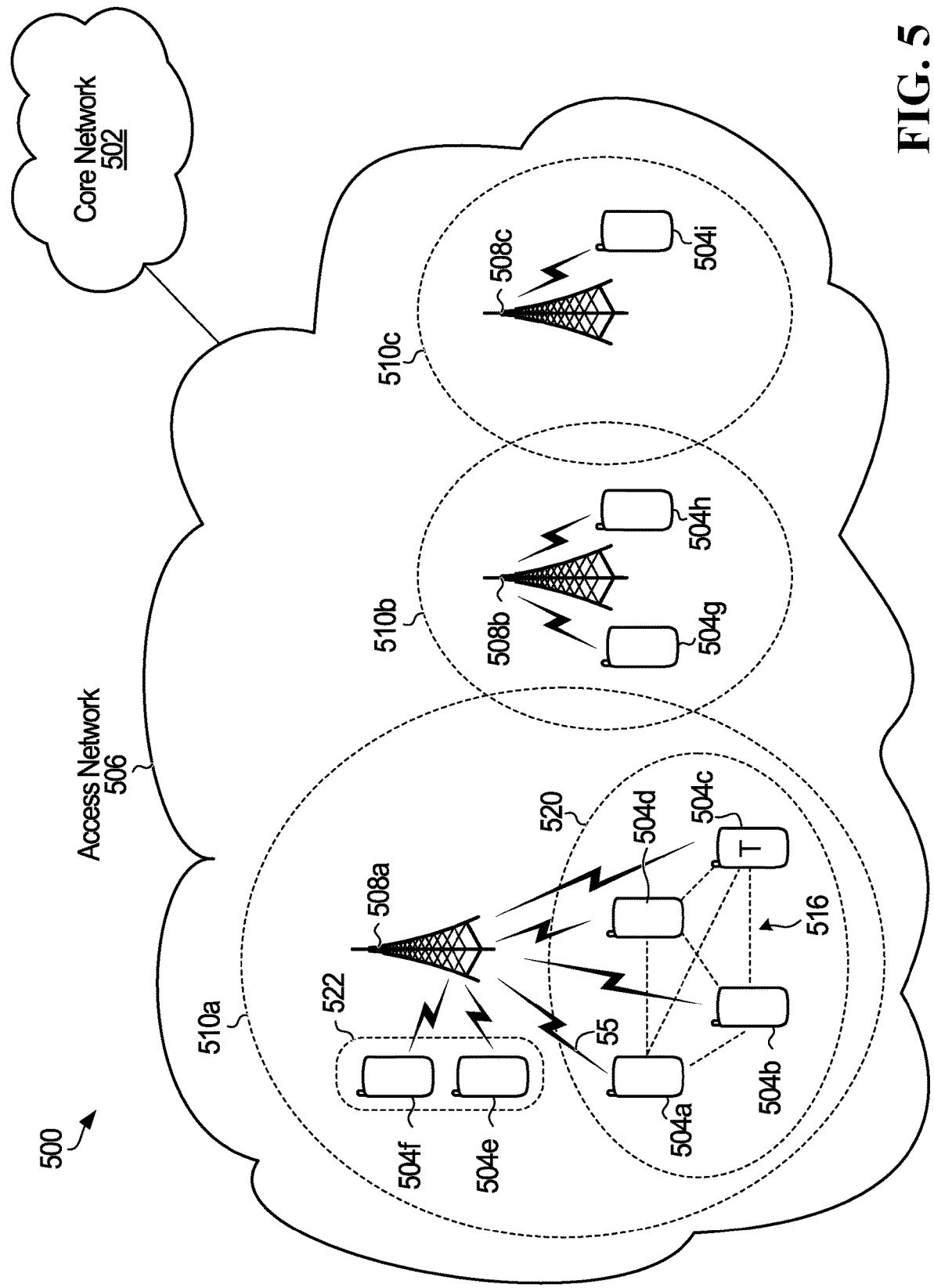
FIG. 5 is a block diagram illustrating an example of a telecommunications network according to one embodiment.

With respect to the initialization procedure, each UE, e.g. UEs in the group 520 shown in FIG. 5, may use a default or configured initial transmission parameter set or use the configured initial transmission parameter set in the configu-ration procedure to select resources for an initial transmis-sion. In some examples, if some UEs have not been con-figured with an initial transmission parameter set, those UEs may just select resources among the RP, such as a specific transmission pattern, from the RP.

Resource Indication/Reservation Procedure

Regarding the resource indication/reservation, each UE may use the default or preconfigured initial transmission parameter set in the initialization procedure to transmit an indication signal in a SL channel, such as a physical sidelink control channel (PSCCH), or a physical sidelink shared channel (PSSCH), to indicate reserved transmission resources to other UEs. The common way to carry the reservation information is SCI, as described earlier. In example embodiments, each reserved transmission resource is associated with a priority indicator that indicates a priority value of the reservation.

The priority value may be a value indicating the priority associated with a data packet or data. The priority may be determined based on quality of service (QOS) of the data or data packet. For example, the priority can be ProSe Per-Packet Priority (PPPP) based on the per-packet QoS model. As noted elsewhere in this disclosure, the priority value may be assigned or adjusted depending on the type of transmis-sion that the reservation is being made or to be made (The adjustment of the priority may be used to find the RSRP threshold for resource selection purposes. In this regard, in example embodiments the indication signal sent by a UE includes a resource indication that identifies the transmission resources the UE is reserving, as well as a priority indicator for the resource reservation (e.g., the priority of the packet to be transmitted) and/or reservation type information for resource selection and reservation. The priority indicator may indicate a priority of the data packet or a QoS priority of the data that is been transmitted in the current transmis-sion or to be transmitted on the reserved resource by the reservation UE. The reservation type information may explicitly or implicitly indicate the resource reservation type as discussed earlier.

UEs that detect and receive the indication signal can determine, based on the information included in the reser-vation indication, the resource reservation type, and priority identifier, what transmission resources to exclude from a pool of candidate resources in order to mitigate against collisions.

In some examples, the indication signal may additionally indicate current resource in use, general time-frequency resource for transmission, one or more of periodicity num-bers.

In some examples, the reserved transmission resources may include transmission resources for future transmissions and/or retransmission.

Prior to describing the sensing procedure, resource selec-tion procedure, and transmission procedures, a description of the types of resource reservation and the assignment of priority levels to those resource reservation types will now be provided in greater details according to example embodi-ments.

As noted above, examples of different resource reservation types include:
- (a) reservation for future transmission of different TBs, including subtypes of
  - (a1) long term reservation of SL resource,
  - (a2) reservation of SL resource for transmission of a selected or explicitly indicated number of resources for different TBs, and
  - (a3) no reservation of SL resources for different TBs; and
- (b) resource reservation for blind retransmission of the same TB; and
- (c) resource reservation for feedback-based retransmission of the same TB; and
- (d) resource reservation for an initial transmission of a TB using a standalone advance control signal preceding initial transmission of the TB.

In example embodiments, the resource reservation type is indicated in the SL control information (SCI) transmitted through a physical SL control channel (PSCCH), such as in SCI, or in the first stage of a two-stage SCI.

In one embodiment, the SCI optionally includes an indicator indicating the number of retransmissions for which resources are to be reserved, and an indicator indicating the TFRP index for the given number of retransmissions. The number of retransmissions may include the current transmission or exclude the current transmission.

In another embodiment, if the available TFRP pool of the sensing UE already includes TFRPs associated with different number of retransmissions, the first stage SCI may optionally include only the TFRP index. In this case, the TFRP index would be sufficient for the sensing UE to select the appropriate TFRPs.

Resource Reservation Type (a)

Reservation Type (a1)—Long Term Resource Reservation for Future Transmission of a Different TB Type (a1) reservation is a reservation of a sidelink resource for a transmission of a TB via signaling associated with a prior transmission of a different TB. Resource reservation for future transmission of a different TB refers to a reservation that is specified in the indication resources for a future, different data transmission (e.g., a second TB that is not a repetition of the first TB). Thus, resources reservation of a future TB means that each UE may use the indication signal sent in association with a first TB to reserve resources for transmission of a future, second TB that is different than the first TB. For example, the indication signal transmitted in an SCI associated with a first TB, e.g. TB1, can include a resource reservation for a transmission of a second TB, e.g., TB2. In different examples, the resource reservation for TB2 may be included only in an indication signal associated with the initial transmission of TB1. In some examples, the resource reservation for the future TB2 may be included in the indication signal associated with both an initial transmission of TB1 and any retransmissions of TB1. In various examples, the resource reservation for TB2 could include reservations for transmission resources for: (i) only the initial transmission of TB2; (ii) the initial transmission and all or a specified number of retransmissions of TB2; or (iii) only a specified number of retransmissions of TB2. In example embodiments, some or all of the above examples may be available as configurable options. Long term here refers to reservation of future transmission resources in a periodic way, without specifying a fixed number of TBs to be reserved. The periodicity or resource reservation period (RSVP) can be indicated in the reservation signal or is a predefined value or configured/preconfigured values in the RP configuration (e.g. the reservation period is the same period of TFRP pool described by FIG. 1A and FIG. 3).

The expression "long term" is used here to differentiate Type (a1) from Type (a2) to be described below, which reserves a specific number of resources for future TBs. For example, when a transmitting UE transmits a TB through sidelink transmission using a specific resource located at T0, the associated indication signal may explicitly or implicitly indicate that the transmitting UE will use the resources at $t_0+$nx RSVP (n$>=$1 and n is an integer) at the same frequency location to transmit future TBs. In some other scenarios, the frequency location of the reserved resource for a future TB may be the same as the frequency location for the current transmission. The frequency location for a future TB may be determined based on frequency hopping or other factors other than the frequency location of the current transmission. With a long term reservation, the UE may change the resource used in the future if a resource reselection is triggered, or might not use the reserved resource at a given time if the UE does not have any data packet to transmit at that time.

Reservation Type (a2)—Resource Reservation for Future Transmission of an Explicitly Specified Number of Resources for Future TBs In reservation Type (a2), a transmitting UE may explicitly reserve resources for a selected or defined number of future TBs to be transmitted using the same periodic resources.

For example, the reservation indicator included in an SCI associated with an initial data transmission (e.g. initial TB1 transmission) may specify that a particular time/frequency resource at time frequency location, e.g. $(t_0, f_i)$, within a RP is to be reserved for the TB1 transmission. The reservation indicator may also indicate that the same resource will be required for a resource reservation period (RSVP) for each of a specified fixed number (m) of TBs. Thus, the transmitting UE will use the resource at time location $t_0+$n×RSVP (1$<=$n$<=$m) and same frequency location to transmit m number of future TBs. When the transmitting UE knows the number (m) of future TBs to be transmitted, the UE can reserve resources, with the initial TB request, for the future (m) TBs without the need to perform any resource reselection until after transmission of the m TBs has been completed.

In some embodiments, if the transmission pattern pool or TFRP pool is defined periodically with a periodicity, then the RSVP may be equal to the periodicity.

Reservation Type (a3)—No Resource Reservation

When no periodic resource is to be selected or reserved, the SCI may simply indicate no reservation with an indicator.

In some embodiments, the SCI may indicate the number (m) of resources reserved for future transmission where one of the possible choices is m=0. When m=0, it is indicated that there is no reservation of resources for future TBs. Another possible value of m is infinity or unknown, indicating a long term reservation. When m is a finite positive integer, it indicates m number of resources are to be reserved for transmission of future TBs.

Reservation Type (b)—Resource Reservation for Blind Retransmission

Type (b) reservation is a reservation of a sidelink resource for transmission of a TB via signaling associated with a prior transmission of a different TB. A blind retransmission, also referred to as repetition, is a retransmission of a TB that is not triggered or terminated by HARQ feedback or scheduling grant. After an initial transmission, a TB is retransmitted without waiting for a feedback of the initial transmission and without receiving a new scheduling grant for a retransmission. In some examples, reservation of resources for one or more blind retransmissions can be indicated in the indication signal sent as SCI associated with the initial TB transmission. In some other examples, reservation of transmission resources for the blind retransmission may be an indication implied in a DMRS sent with the initial TB transmission. The indication may be implicit. For example, the DMRS information (e.g. DMRS port or DMRS sequence) may have a mapping relationship with TFRP or the location of time frequency resource of the retransmission, in which case detecting the DMRS gives the information which TFRP or which time frequency resource for retransmission is used by the transmit UE. The reservation indication for a resource reservation for a blind retransmission typically includes an indication of the time-frequency resources, e.g. indication of a TFRP, that will be used for the blind retransmission.

If the number of retransmissions of a TB is greater than 1, two options for reserving retransmission resources include: option 1, for each transmission, for example including an initial transmission and each retransmission, of a TB, reserve the resources for all of the following transmissions/retransmissions of the TB; and option 2, for each transmission, e.g., initial transmission or retransmission, of a TB, only reserve the resources required for the next/subsequent retransmission of the TB. Option 1 provides earlier notification of subsequent resource requirements but may require more network overhead to indicate the reserved resources. In some example embodiments, a UE may be configured to only perform option 1, and in some example embodiments a UE may be configured to only perform option 2. In some examples, a UE may be configured to select between option 1 or 2 based on one or more criteria. For example, a UE could be configured to determine if the number of TB retransmissions is greater than a threshold, and if so, use option 2, otherwise use option 1. In some examples, option selection could be based on sensed channel information. In some examples, the number of blind retransmissions that will be performed may be configured or preconfigured for the UE, and in some examples the UE may be configured or preconfigured to select the number of blind retransmissions up to a predefined or (pre-)configured number. The selection can be based on criteria such as sensed channel conditions or transmission backlog at the UE.

Reservation Type (c)—Resource Reservation for Feedback-Based Retransmission

Reservation Type (c) relates to reservation of feedback-based retransmission, which is similar to reservation for blind retransmission but allows the UE to take account of feedback information about the success of earlier data transmissions. Example feedback information includes, for example, Hybrid automatic repeat request (HARQ) feedback.

In an embodiment, in a reservation Type (c) transmission, the indication signal sent by the transmitting UE associated with an initial data transmission, e.g. transmission of TB1, or one of the retransmissions of the TB, may include a reservation indication for K potential retransmissions including the initial transmission. However, upon receiving feedback indicating that a prior transmission or retransmission was successful, e.g. upon receiving an ACK indicating successful decoding of the transmitted TB1, the UE may release the previously reserved resources for future transmission and will not perform the retransmission using that reserved transmission resource. The UE may or may not send out a further indication/notification to release these reserved retransmission resources.

Reservation Type (d)—Resource Reservation for an Initial Transmission of a TB Using a Standalone Advance Control Signal Preceding Initial Transmission of the TB Reservation Type (d) reserves resources for initial transmission of a TB using a standalone SCI.

When a transmitting UE reserves an initial transmission of a TB, the reservation signal can be sent in advance without an associated data or PSSCH transmission. The reservation signal can be sent in an SCI or a dedicated reservation signal. The reservation of the initial transmission of the TB may be indicated and sent in a separate indication signal, e.g., SCI, in a control channel in advance.

Additional Example Indication Options

In a further embodiment, to indicate the resources to be reserved for the current transmission and for retransmission of the same TB, and/or for detection purpose, the SCI may include indication information for indicating the TFRP for two (2) retransmissions. When four (4) retransmissions are required, the indication for the 2-retransmission TFRP may be repeated in the indication signal, or two indications for two different 2-retransmission TFRPs may be concatenated to form the indication for the 4 retransmissions. Indication for other multiples of 2 retransmissions may be formed similarly by repetition or concatenation.

In yet another embodiment, the SCI may indicate the number of retransmissions, and further include a time domain slot pattern indication and a frequency domain subchannel based hopping offset.

For example, in cases where the available resources include a (pre)configured TFRP pool, the SCI may indicate the TFRP index for resource selection and reservation.

As an example for illustrative purposes, if the number of retransmissions is denoted as "K" and the maximum number of retransmissions is denoted as "Kmax," which includes the current transmission, and the Kmax is limited to 4, then the possible choice of the K are [1, 2, 3, 4]. In some scenario, the choice of K is further limited, e.g., K can be [1, 2 or 4], but cannot be 3 in order to reduce signaling overhead. A TFRP pool may be defined for each particular number of retransmissions, and the TFRP pool is associated with a TFRP index. During operation, the indication signal may simply indicate the TFRP index in order to indicate the particular TFRP pool associated with the particular TFRP index.

Examples of TFRP are shown in FIGS. 1A and 1B. It is noted that as shown in the below examples the TFRP pool for 4 transmissions may need 5 TFRPs in the pool. If it is desired to use the same pool size, or the same number of TFRPs in the pool, for different numbers of transmissions, a possible option is to repeat the same TFRP pool for 4 transmissions over the next 5 slots. Another possible option is to create an N=4 TFRP pool by repeating an N=2 TFRP pool.

In another example, two TFRP pools for N=2 and N=4 may be combined to form one TFRP pool with 15 resource patterns, and the resulting TFRP is associated with a separate TFRP index. In this case, the indication signal only needs to indicate the TFRP index of the combined TFRP pool to indicate that the combined TFRP pool is to be reserved.

In a further example, the TFRP index of the TFRP for a first 2-transmission reservation is indicated in a first indication signal. To reserve the resources for K=4 retransmission, the TFRP for the 2-transmission may be repeatedly used, or a second indication signal may indicate a different TFRP index for a different TFRP for two (2) of the four (4) transmissions.

Regardless of whether a TFRP pool has been configured or pre-configured, the indication signal may directly indicate the actual time-frequency resource to be reserved, without explicitly indicating any (pre)configured TFRP pool.

Therefore, in various embodiments, indication of a TFRP index in a TFRP pool can be replaced with direct indication of the time frequency resources of the TFRP. It is possible to indicate time frequency resources based on a given TFRP pool with all possible combinations of the TFRPs in the pool under certain constraints. For example, a possible constraint may be that all transmissions of a TB must fit within a predetermined or preconfigured maximum number of slots.

In various embodiments, when the time frequency resources of the current transmission and the reserved retransmission are indicated in the indication signal, the time resources and frequency resources may be indicated separately and independently.

In the time domain, the time resources may be indicated using a bit map, or an index of all time slot combination options within a delay constraint. For example, the delay constraint may be that the maximum time gap between the first transmission and the last transmission is a given number of slots, such as M slots.

For time resource indication, a bit map may be used to indicate whether each particular time slot has been used or not. As an example, assume the maximum time gap between the first and last transmission is 7 slots. If a total of K=4 transmissions for a TB is indicated, with the time gap between adjacent transmission as 2 slots, 1 slot and 2 slots, then the bit map can be indicated as [0 1 1 0 1 0 0], with respect to the current slot (denoted as slot 0) that is used to perform the first transmission, so that slots 2, 3 and 5 are used for retransmissions, and slots 1, 4, 6 and 7 do not have any transmissions.

For time resource indication, a time resource index may be used to indicate a time domain pattern among a predefined pool of time domain patterns. The time domain pattern and index may be assigned based on predefined table mapping, or based on certain rules.

As an example, if the maximum time gap (T) between the first and last transmissions is T=7 and the number of retransmission resources reserved is 3, the total number of reserved transmission and retransmission resources including the current transmission is 4. It is not necessary to indicate the time location, e.g. the time slot number, of the current transmission if this time location is in the same time slot as the SCI. The total number of available choices of possible combination of 3 retransmission resources among 7 slots is 35 (=7 choose 3=7*6*5/3*2*1). This number of choices will require 6 bits to indicate in this example.

In the above example, it is assumed that the number of reserved retransmission resources is known or has been indicated separately.

In some embodiments, all combinations of possible numbers of reserved retransmission resources and possible time domain resource patterns may be indicated using a single time domain resource pattern index. For example, if the only possible repetition numbers are 1, 2, or 4, the number of possible resource combinations is 35, as illustrated above. Similarly, it can be shown that the number of possible resource combinations is 7 for up to two (2) retransmissions, and 1 for one retransmission. The total number of possible resource combinations is thus 43=35+7+1=43. An index for indicating all the 43 possible combinations may be defined using a time domain resource index. The mapping of the index to all 43 possibilities may be defined in a table or described in a predefined rule. The number of reserved retransmission resources can be derived from the time domain resource index or a resource pattern index. Thus, it may not be necessary to separately indicate the number of reserved retransmission resources.

Another possible option for indicating the time resource is to indicate the time gap between each transmission and its next transmission. For example, for a total of 4 reserved transmission/retransmission resources including the current transmission, it is possible to indicate the time gap between the current transmission and the next ($2^{nd}$) transmission, the gap between the $2^{nd}$ and $3^{rd}$ transmissions, the gap between the $3^{rd}$ and $4^{th}$ transmission. For a total of N transmissions, the indicated time gap may be up to the gap between the (N−1)th and Nth transmissions. For example, if the maximum gap between two adjacent transmissions is 4 slots, for 4 transmissions, a total of 2*3=6 bits are needed to indicate the time gaps. If the maximum gap is 2 slots, then only 3 bits are needed to indicate the time gaps.

In some embodiments, the time gaps between all adjacent transmissions may be the same, in which case only one time gap value needs to be indicated.

In the frequency domain, a hopping offset in terms of the number of subchannels hopped between two repetitions can be indicated.

The indication signal may indicate the frequency resources to be reserved by indicating the following information.

The indication signal may indicate the size of the frequency resources in terms of the number of subchannels, the starting subchannel index of the initial transmission, and possible further optional information for retransmission as discussed next.

One possible option is to use the same subchannel or subchannels used for the initial transmission for all subsequent retransmissions, in which case no further information, and 0 bit, is needed to indicate the frequency resources for retransmission.

Another option is to indicate the starting subchannel index for current transmissions and retransmissions separately. The number of subchannels used for each transmission may be the same, in which case only the number of subchannels used for the current transmission need to be indicated.

A further option is to indicate the frequency resource for the initial transmission or the first transmission and a Frequency offset (F0), in terms of the number of subchannels, for frequency resources to be used in retransmission. The frequency resource for initial transmission may include size of the frequency resources in terms of the number of subchannels, and the starting subchannel index of the initial transmission. In this case, the F0 can be assigned or specified in various suitable manners. For example, the FO can be an offset between odd frequency slots and even frequency slots based on an absolute slot index. The FO can be an offset between any adjacent pair of slots. The FO can be an offset between adjacent odd and even numbered repetitions. The FO can be between any adjacent repetitions.

As an example of subchannel based frequency offset indication, assuming j=[0, 1, . . . , K−1] refers to the retransmission/repetition index, i.e., the index of the number of transmissions starting from 0. If in the SCI, the starting frequency subchannel indicated as f_0, then the starting frequency subchannel of all transmissions with retransmission index j is given by f_(j+1)=(f_j+FO) mod (total number of available frequency subchannels M_sub); j=[0, . . . , K−2] and f_j=f_0 at j=0; mod is the modular function, and the modular function is optional, and the purpose of modular function is to ensure the frequency subchannel after offset still located within the range of available frequency subchannels. If the frequency offset is defined for only between odd and even adjacent repetitions, then we may have f_j= (f_0+FO) mod M_sub, if j=odd number, and f_j=f_0 if j=even number. In the case, the $2^{nd}$ repetition has an offset FO with respect to the $1^{st}$ transmission, but $3^{rd}$ repetition has the same frequency location as the $1^{st}$ transmission, and $4^{th}$ repetition has an offset of FO with respect to the $3^{rd}$ repetition. Similarly, if the frequency offset is defined with respect to the slot index, we have for a repetition located in slot index j, f_(j+1)=(f_j+FO) mod M_sub, where j=[0, 1, . . . , M_slot−1], where j is the slot index in a frame and M_slot is the number of slots in a frame and f_0 is indicated. Again, if frequency offset is defined between even and odd slots, we have for a repetition located in slot index j, f_j=(f_0+FO) mod M_slot, if j is an odd number, and f_j=f_0 if j is an even number.

To accommodate the added indication information related to reservation type and identification of reservation resources, the SCI may have different data sizes, e.g. bit sizes, and different formats.

For example, in some embodiments, depending on the number of retransmissions, the SCI may have a different format for each different number of retransmissions, in this case, the number of retransmissions may be implicitly indicated by the SCI format and does not need a specific field within the SCI to explicitly indicate it. In another embodiment, only 1 SCI format used for all possible numbers of retransmissions. The SCI may be formatted to consider all possible numbers of retransmission reservations together, and use one index to indicate the time frequency resource index, or only the time domain resource index.

In an example embodiment, a unique priority indicator or priority coefficient or priority adjustment value for adjusting the priority of a data packet, or a resource exclusion threshold for excluding resources from selection, may be set/preconfigured to correspond to the associated reservation type.

In example embodiments, a priority indicator for a resource reservation may be included in an indication signal that is sent in respect of the resource reservation. In various example embodiments, the indication signal may be incorporated into one or more of SCI sent in the PSCCH, or a DMRS or preamble sent in the PSSCH. In some examples, the indication signal may be an advanced indication signal that precedes a data transmission.

As now can be appreciated, in an embodiment, the sensing UE needs to know the reservation type of a data transmission reservation from the reservation UE in order to adjust the data packet priority for resource selection. Conveniently, the reservation type can be explicitly indicated in the reservation signal, such as a first stage CSI. In some embodiments, the reservation type may be Implicitly obtained from a property of the reservation, or from a combination of multiple reservation properties and the reservation signal.

For example, for reservation of retransmissions of the same TB as the current transmission associated with the SCI, if the retransmission resources are indicated, it implies such retransmission resources are also reserved. Other ways of indicating retransmission resource have been described above. If a retransmission resource is indicated, it may by default indicate that the corresponding retransmission resource is reserved, and there is no need to have an extra bit to indicate whether there is a reservation for retransmission of the same TB. However, in order to know whether the reservation is for blind retransmission or feedback based retransmission for the same TB, there may be a bit (A) to indicate which one of the two types is for the reservation of retransmission resource. In some scenarios, there may be also a bit (B) within SCI to indicate whether the receiver UE should send HARQ feedback for the current data transmission associated with the SCI. In some scenarios, the bit B to indicate whether there is HARQ feedback associated with the current transmission and the bit A to indicate whether the reservation type is blind retransmission (Type b) or feedback based retransmission (Type c) may be the same. In this case, the UE may use bit B to implicitly derive whether the reservation of retransmission resources is for blind retransmission or feedback based retransmission. In some other scenarios, the bit B and bit A may be separate bits in SCI, and they can be different. As an example of different bits, if reservation of 4 transmissions of a TB is indicated in SCI, in the SCI fields for bit B of the 4 SCIs associated with the 4 transmissions may be [0, 1, 0, 1], respectively, indicating to the receiver to send HARQ feedback for the $2^{nd}$ and the $4^{th}$ transmissions, but no feedback for the $1^{st}$ and $3^{rd}$ transmissions. However, in the SCI of the $1^{st}$ transmission reserving all 4 transmissions, bit A may be 1, indicating that this is a feedback based retransmission for the sensing UE, because the $3^{rd}$ and $4^{th}$ transmission may be terminated and resource may not be used, so the sensing UE should treat the priority adjustment and RSRP threshold adjustment for resource selection according to Type c, i.e., reservation for feedback based retransmission.

For reservation of periodic resources for a different TB, the UE may determine whether the reservation is for sub-type a1) a2) or a3) from one or more of the relative information indicated in SCI, e.g., RSVP, number of reserved period resources and/or bit indicating whether reservation of periodic resource is enabled or not. The details have been described earlier. In another embodiment, whether reservation of resources for a different TB is supported can be enable/disabled by (pre)configuration. For example, in the RP configuration, there may be one bit indicating whether reservation of resources for a different TB is enabled or disabled. If reservation of resources for a different TB is disabled, then sensing UE may always assume no periodic reservation (Type a3), and in the SCI format, the respective reservation field, such as RSVP, number of reserved period resources and/or bit indicating whether reservation of periodic resource is enabled or not are not needed to be in the SCI. On the other hand, if reservation of resources for a different TB is enabled, the UE may have the option to choose sub-type a1, a2 or a3 and indicate the type through the respective field in SCI (RSVP, number of reserved period resource and/or bit indicating whether reservation of periodic resource is enabled or not). In this case, there may be two different SCI formats corresponding to the two case whether reservation of resources for a different TB is enabled or disabled.

In another embodiment, the method to assign different priorities to different reservation types may be achieved by directly incorporating the different priority levels associated with different reservation types in the reservation signal. In this case, when a transmitting/reservation UE obtains the packet priority $P_d$ from the priority information associated with the data transmission, the transmitting/reservation UE may directly apply different predefined or preconfigured or configured coefficients (e.g., $a_i$ or $c_i$) to obtain or calculate P(a1), P(a2), P(b), P(c), and P(d) respectively, and indicate the final priority level P(i) instead of $P_d$. In this case, the sensing UE does not need to take into account the reservation type when processing the priority information from the reservation signal to be used for resource selection. For example, for reservation Type (a1), a transmitting UE indicates P(a1)=$a_{a1}$*Pd in the priority indication of the reservation signal, whereas for reservation Type (b), a transmitting UE may indicate P(b)=$a_b$×Pd, where $a_{a1}$ and $a_b$ are the priority coefficients associated with Type (a1) and Type (b) reservations respectively. In an example, $a_b$ is between 0 and 1, and $a_{a1}$=1. In this case, the sensing UE obtains the priority information that has already taken into account the reservation type, and the sensing UE does not need to differentiate the reservation type to use the priority value for resource selection.

In some examples, the priority levels may be dynamically determined based on sensed information, including sensed reservation type, by each sensing UE when the sensing UE performs the sensing procedure, which will be described in more detail in the sensing procedure section below.

In some examples, different reservation types may have different impacts on the resource selection procedure. For example, as discussed earlier, for reservation Type (a1), the reservation UE might not actually use the same resource during the resource selection window of the sensing UE because it may not have a data packet to transmit or a (re)selection has occurred. For reservation Type (b), the reservation UE reserves the resources for blind retransmission and is more likely to use the reserved resource for retransmission thus having an impact on the sensing UE. For reservation Type (c), the reservation UE may release the reserved resource for retransmission based on a HARQ-feedback indicating receipt of an ACK before the retransmission. Therefore, reservation Type (b) may be given a higher priority over reservation Type (a1) and Type (c). That is, P(b)>P(a1), and P(b)>P(c). One way to realize the different priority of different type is through adjusting the priority (e.g. by applying a reservation type specific coefficient) to the packet priority before using it to determine the RSRP threshold, as further described later.

In another embodiment, with respect to reservation Type (c) resource reservation for feedback-based retransmission, for unicast, a receiving UE (Rx UE) can adjust its behavior on whether or not to expect a retransmission based on the HARQ feedback. For a sensing UE (other UE), their resource selection scheme should lower the priority of a reservation if the reserved resource can be released. This can be achieved by adjusting the priority level by multiplying it with a coefficient less than one if there is a chance the reserved resource may be released based on the HARQ feedback. In such case, a sensing UE should adjust the priority associated with reservation of HARQ-feedback based retransmission to be lower than the reservation of blind retransmission for the purpose of resource (re)selection. In this case, P(b)>P(c). Similarly, reservation using a standalone SCI cannot be terminated by any HARQ feedback., i.e., type (d), may have higher priority than type b), e.g. P(d)>P(c) and may be P(d)=P(c);

The sensing procedure, resource selection procedure, and transmission procedure will be described in greater detail next.

The sensing procedure, resource selection procedure, and transmission procedure may be performed by a UE autonomously. As a result of these procedures, the available candidate resources to a UE may be reduced, which decreases the risk of collision. The probability that multiple UEs will select a common resource for transmission at the same may be reduced according to these procedures.

Before the resource selection procedure, such as TFRP selection, a sensing UE may perform sensing based on decoding of the SCI. The sensed information may include all potential reservation types indicated earlier.

During the sensing procedure, each UE listens to a communication channel, such as PSCCH or PSSCH, to detect signals, including for example SCI sent on PSCCH and DMRS sent on PSSCH, from other UEs within the sensing window. The sensed information or signal may be utilized to reduce the size of a set or pool of candidate resources available for selection by the UE for transmission.

During the selection process, the UE selects radio resources from the reduced set or pool of candidate resources.

During the transmission process, the UE uses the selected physical resources to transmit data and control information.

In example embodiments, the reservation/selection and transmission processes are performed by the UE autonomously.

Sensing Procedure

In the sensing procedure, during a sensing window, a UE such as a sensing UE monitors indication signals and other signals from another UE in one or more SL communication channels, such as SCI in PSCCH or DMRS in PSSCH, to determine what channel resources are being used and being reserved by other UEs. As noted above, in example embodiments the indication signals include a reservation indication indicating what resources are being reserved, including the reservation type, and possibly priority indications (e.g. packet priority) for respective resource reservations.

In the case where an indication signal is incorporated into SCI, a sensing UE receives and decodes the SCI to obtain information including resource indications and resource reservation type indications, and possibly priority indications.

In some examples, DMRS can be used as implicit indication signals. In some examples, DMRS reception can be blindly performed by a sensing UE, and in some examples a sensing UE may be configured or preconfigured with information about DMRS configurations. In the case where a sensing UE has detected a DMRS blindly in PSSCH, the sensing UE may measure SL reference signal received power (RSRP) of the DMRS.

In some examples, each UE is configured or preconfigured with a transmission pattern pool, such as a TFRP pool, a DMRS pool, or a priority pool, along with mapping information that maps each DMRS from the DMRS pool to a transmission pattern from the transmission pattern pool and a respective priority level from the priority pool. In some examples, multiple different DMRS may map to the same transmission pattern or priority level. In this regard, the DMRS can function as an indication signal that includes a reservation indicator and a priority indicator, with each DMRS mapping to a transmission pattern and mapping to a priority level. In some examples, the association/mapping configuration may be updated at UEs through signaling, such as through radio resource control (RRC) signaling.

Using these mapping relationships, the sensing UE can derive or determine, based on detected DMRS, which resources or patterns other UEs are using and which resources or patterns other UEs have reserved, and the priority levels associated with these resource reservations. The mapping of DMRS to specific patterns/priority levels may be based on one or a combination of DMRS sequence, different roots/initialization for the DMRS sequence, different cyclic shift values, DMRS time and frequency locations such as different symbols, different orthogonal cover code used, different antenna ports, different code division multiplexing (CDM) groups, different DMRS patterns, or some other aspects of the DMRS.

Resource Selection Procedure

The sensing UE selects resources for a subsequent transmission or a retransmission based at least in part on reservation type, the packet priority indicated by other UEs and the packet priority level of the data that is being transmitted by the sensing UE. The sensing UE then adjust the packet priority value of the reservation based on the reservation type and find the RSRP threshold according to the adjust priority value and determines whether to exclude resources reserved by the sensed reservation type.

The priority (P) or threshold (Th) associated with a reservation may be determined or adjusted based on the reservation type. Example reservation types and their corresponding priorities or thresholds are described in greater detail below.

Priority P(a1) for Reservation Type (a1)

For illustrative purposes, the priority indicator P(a1) is used herein to represent a priority value or a priority level that is associated with or dependent on the reservation Type (a1) resource reservation for future transmission of a different TB. However, in some example embodiments different priority values may be assigned to a given reservation type described herein including Type (a1).

Similarly, priority indicators P(a2), P(b), P(c), and P(d) are used herein to respectively represent a priority value or a priority level that is associated with the respective reservation Type (a2), Type (b), Type (c), or Type (d), or that is dependent on the respective reservation type.

Each of these priority indicators may also depend on the priority of the data packet.

In at least some examples, different priority levels may be associated with each one of the different reservation types.

In some examples, a priority indicator, such as one or more of priority indicators P(a1), P(a2), P(b), P(c), and P(d), may be obtained through an equation, a value, a mapping table, or any other types of parameters to define the priority value or the priority level.

In some examples, NR V2X supports an initial transmission of a TB without reservation, depending on the sensing and resource selection procedure. In some examples, a priority indicator corresponds to NR V2X specified functionality that supports reservation of a SL resource for an initial transmission of a TB at least by an SCI associated with a different TB, depending on the sensing and resource selection procedure. This functionality can be enabled/disabled by configuration or pre-configuration.

Priority P(a2) for Reservation Type (a2)

A difference between Type (a2) and Type (a1) is that a UE is more likely to use the resources it has reserved in Type (a2) than in Type (a1), because in Type (a2) the UE has information on the number of the data packets or TBs to be transmitted and does not need to perform reselection of resources before the expected m TBs have been transmitted.

For illustrative purposes, the priority indicator P(a2) is used herein to represent a priority value or a priority level that is associated with, or dependent on, the reservation Type (a2) resource reservation for future transmission of an explicitly specified number of TBs.

No priority indicator for reservation Type (a3).

When no resource is to be selected or reserved, there is no need to specify any priority or threshold.

Priority P(b) for Reservation Type (b)

For illustrative purposes, the priority indicator "P(b)" is used herein to represent a priority value or a priority level that is associated with the reservation Type (b), or dependent on the reservation Type (b).

Priority P(c) for Reservation Type (c)

For illustrative purposes, the priority indicator P(c) is used herein to represent a priority value or a priority level associated with or dependent on the reservation Type (c) for feedback-based retransmission.

Priority P(d) for Reservation Type (d)

For illustrative purposes, the priority indicator P(d) is used herein to represent a priority value or a priority level that is associated with, or dependent on, the reservation Type (d) resource reservation for an initial transmission of a TB using a standalone advance control signal preceding initial transmission of the TB.

Sensing UE's resource selection behavior with respect to the different reservation type can be summarized as the following steps:
1) The sensing UE obtains the packet priority of the reservation from decoding the SCI of other UE that performs the reservation, and obtains the corresponding packet priority field in the SCI
2) The UE determines the reservation type or sub-type explicitly or implicitly based on corresponding information in the SCI as described earlier
3) The UE adjusts the packet priority of the reservation based on the reservation type
   a) The adjustment can be done by multiplying the packet priority value with a reservation type specific coefficient
   b) The priority coefficient for reservation of HARQ-feedback based retransmission<Priority associated with the reservation of blind retransmissions
   c) The priority coefficient for long-term reservation<Priority associated reservation of resources for a fixed number of TBs
4) The UE uses the adjusted packet priority, along with the packet priority of its own data to be transmitted, to find the corresponding RSRP threshold (e.g. through a mapping table)
5) If the RSRP measurement associated with the reservation SCI is above the determined RSRP threshold, the corresponding reserved resource should be excluded in the candidate resource in the resource selection procedure As illustrated earlier, in some examples, the priority values associated with different reservation types that are used for resource selection by a sensing UE may be derived or determined based on the packet priority for the reservation as well as the reservation type. For example, an adjusted priority P(i) may be calculated using one of Equations (1), (2) or (3), $$P(i) = a_i \times P_d, \quad (1)$$

$$P(i) = a_i \times \Delta P_d, \quad (2)$$

$$P(i) = P_d + c_i, \quad (3)$$

where i may represent a1, a2, b, c, or d, corresponding to Type (a1) to Type (d) respectively; $a_i$ is a priority coefficient associated with reservation Type (i); $\Delta P_d = P_d - P_{self}$; and $c_i$ is a constant associated with Type (i). $P_d$ is an indicator indicating a relative priority of the current or future data transmission of the UE that performs the reservation, which is the priority of the data packet being transmitted using the TB. $P_{self}$ is the priority value of the data to be transmitted by the UE that is performing the sensing and resource selection. The UE that performs the reservation may be referred to as the "reservation UE" herein and the UE that performs sensing and resource selection may be referred to as the "sensing UE" herein. A sensing UE may be a reservation UE depending on the context.

The priority coefficient, $a_i$, can be predefined, configured or pre-configured during operation, or derived or determined based on known parameters/factors. In some examples, the priority coefficient $a_i$ may be determined by a sensing UE based on the reservation type indicated in a sensed indication signal. For example, when the sensed reservation type is Type (b), $a_1$ may be used to calculate P(b). The value of $a_b$ may be determined in view of Type (b) reservation. Similarly, $a_{a1}$, $a_{a2}$, $a_c$, or $a_d$ may be used for Types (a1), (a2), (c), (d) respectively in a similar manner. The following inequality among the coefficients may be set according to reasons described in this disclosure: $a_{a1} < a_{a2}$; $a_b > a_c$; $a_d > a_c$; An example is $a_{a2} = a_d = a_{b=1}$, while $0 < a_{a1} < 1$ and $0 < a_c < 1$, which means only type c and type a1 reservation need to adjust the priority value. Note that this inequality assumes a higher value of priority level means higher priority. If higher value of priority level means lower priority, then the inequality is reversed. Priority indicator $P_d$ indicates a priority value or level that is associated with the priority of the data packet/traffic the reservation UE is currently transmitting, or with the priority of some data packet/traffic to be transmitted in the reserved resource for future transmission. In some embodiments, the priority level $P_d$ is associated with a priority related property in the logical channel of the transmitted data.

The priority indicator $P_d$ can be explicitly or implicitly indicated in the indication signal (e.g. SCI) or any signal that is associated with the data transmission. For example, a priority level of the data ($P_d$) can be indicated in the sidelink control channel for transmitting SCI that is associated with the SL data transmission in the PSSCH, or priority level $P_d$ can be implicitly indicated using DMRS information, such as DMRS port/sequence information, and its mapping relationship to the priority level. Thus, in such examples, the priority value applied by a UE to a reservation can be based on both the reservation type, with an associated priority coefficient $a_i$ being used to assign different priority levels to different reservation types, and a priority level $P_d$ of the data to be transmitted for which the resource reservation is being made.

In some embodiments, the priority value after adjustment P(a) to P(d) may be determined based on their associated reservation type as follows.

Priority level P(b) may be assigned or set to have a value greater than the value of P(a1), i.e., P(b)>P(a1), for the following reasons. Correspondingly, the priority coefficient may be set to be ab>a_a1. For Type (b) reservation, the transmitting UE reserves the resources for blind retransmission and there is a high probability that the reserved resources will be actually used for retransmission, and the reservation will have an impact on the resources available to the sensing UE. By comparison, reservation Type (a1) is used for long term reservation, and the transmitting UE that reserves the resources or TFRP may not need to actually use the same resources during the resource selection window of the sensing UE, because the transmitting UE may not have a data packet to transmit or a further resource (re)selection has occurred. Therefore, data transmission with Type (b) reservation may be given a higher priority over Type (a1) reservation. In these examples, a higher value of P(i) indicates a higher priority.

In some examples, P(b) and P(a1) may be determined using Equation (1) with the coefficients $a_{a1}$ and $a_b$ being configured to have the relationship of $a_b > a_{a1}$.

For example, in a specific embodiment, it may be configured so that, $$a_b = 1, \text{ and}$$

$$0 < a_{a1} < 1.$$

In one example, $a_{a1} = 0.5$. In another example, $a_{a1} = 0.6$.

The coefficients $a_b$, $a_{a1}$ may be respectively indicated by two different indication signals, or may be indicated in one indication signal.

In some examples, P(b) and P(a1) may be determined using Equation (2). In these examples, a sensing UE can take account of the priority of the data the sensing UE will be transmitting and the priority of the data for which a reservation UE has reserved a resource.

In another example, P(b) and P(a1) may be determined using Equation (3), where $c_b < c_{a1}$. In a specific example, $c_b = 0$, and $c_{a1} = 1$.

The determination of other priority indicators P(i) may be similarly made depending on the relevant reservation types in view of the disclosure herein.

As a further example, P(a2) may be greater than P(a1), i.e. P(a2)>P(a1). For instance, P(a1) and P(a2) may be configured to have the following relationships: P(a2)=$P_d$, and P(a1)=$a_{a1} \times$P(a2); or P(a2)=$a_{a2} \times P_d$, and P(a1)=$a_{a1} \times P_d$. That is, P(a1) and P(a2) are determined using Equation (1), where $a_{a1}$ has a value between 0 and 1, and $a_{a2}=1$. The values of $a_{a1}$ and $a_{a2}$ may otherwise satisfy the relationship $a_{a1} < a_{a2}$. For example, $a_{a1}$ may be 0.5, and $a_{a2}$ may be 0.9. The reason for the above relationship is that there is a high probability that the reservation UE that reserved resources for a specific number of TBs under Type (a2) reservation will actually use the reserved resources for transmission of a future TB, but under Type (a1) reservation, the reservation UE is less likely to actually use the reserved resources because reselection may occur or there may be no data to transmit as discussed earlier.

In some examples, P(a2) may be equal to P(c), because in both Type (c) and Type (a2) reservation cases, the reservation UE has a relatively high probability to actually use the reserved resources.

In some examples, P(b), P(a1) and P(d) may have the relationship of P(d)=P(b)>P(a1). The reason is, like in the case of Type (b), in the case of reservation Type (d) there is a relatively higher probability that the reservation UE will actually use the reserved resources than in the case of Type (a1) reservation. In some examples, P(d)=P(a2). In some examples, P(d)=P(a2)>P(a1).

For example, if a sensing UE detects that a received indication signal indicating a reservation Type (b), the sensing UE may calculate a priority value P(b) corresponding to the reservation Type (b), which may be represented by Equation (1) discussed above, in order to prioritize avoiding a collision with resources that have been reserved in respect of Type (b) reservations. Thus, the sensing UE may determine, when selecting resources, whether resources reserved by the reservation Type (b) should be considered to for exclusion based on the value of P(b). If the sensing UE decides to take the resource reservation Type (b) into consideration for exclusion, when the sensing UE selects resources, the sensing UE may first exclude reserved resources of Type (b) for selection, and then select other available resources from the RP 100, such as a TFRP pool.

In some examples, the resource (re)selection procedure may assign different priorities to different reservation types.

Determination of priorities will now be further discussed according to example embodiments in the example context of three priority levels, for example, in the context of reservation Types (a), (b) and (c).

For Type (c) reservation, there are two possible mechanisms to deal with reserved HARQ-feedback based retransmission. In one embodiment, the UE is able to determine whether the transmitting UE will release the reserved retransmission resources based on the HARQ feedback information that is sent by the transmitting UE to the receiving UE. This embodiment may be applicable to unicast where HARQ feedback is supported and there is only one (1) receiver UE. However, other scenarios, such as groupcast, are not precluded from this disclosure. For each sensing UE, if the UE can decode signals on physical sidelink feedback channel (PSFCH) and obtain information of the signals, the UE can determine whether reserved resources for feedback-based retransmission are being used for the current sensing procedure based on the obtained information on PSFCH. If the sensing UE determines that resources reserved for retransmission have been released by the transmitting UE, such as the sensing UE receives an ACK for unicast transmission, the sensing UE does not need to avoid using the particular resources for its own transmissions.

In another embodiment, the sensing UE may ignore the reservation information because the sensing UE can expect the transmitting UE to release the reserved resource based on the reservation type.

In some examples, if the sensing UE determines that resources reserved for retransmission have not been released, such as the sensing UE detects a NACK or does not detect any signal or feedback on PSFCH, the sensing UE may set the priority level/value of Type (c) to equal to the priority level/value of the Type (b), that is, P(c)=P(b). In that case, when the sensing UE selects resources, the sensing UE excludes both the resources of Type (b) corresponding to P(b) and the resources of Type (c) corresponding to P(c), and then selects other available resources from the RP 100 (e.g., TFRP pool).

In another method involving Type (c) reservation, a sensing UE may not be able to detect other UEs' feedback or may be unable to determine whether a transmitting UE can or will release the retransmission resource. In this case, the sensing UE can lower the priority level of the reservation Type (c) for resource selection purpose. Thus, P(c) may be set, predefined, determined, or calculated to be at a lowest level, or to be lower than the priority level of P(b), i.e. P(c)<P(b). In the case where P(c)<P(b), P(c) and P(b) may be defined using Equation (1) with P(b)=$P_d$, P(c)=$a_c \times$P(b), where 0<$a_c$<1; or P(b)=$a_b \times$Pa, P(c)=$a_c \times$Pa, and $a_b$>$a_c$.

P(b) and P(c) may be calculated by the sensing UE, at least in part based on the sensed reservation type, and used for resource selection. The coefficient $a_c$ may be predefined or (pre)-configured or derived based on potential packet loss probability and/or probability of releasing the reserved resources of the feedback-retransmission. Thus, when the receiving/sensing UE selects resources, if the receiving/sensing UE detects that an indication signal indicates a reservation Type (c), the sensing UE may determine that when selecting resources, whether resources reserved by the reservation Type (c) will be considered to be exclude by the sensing UE based on the calculated value of P(c). If Type (c) reservation is to be excluded for selection, the sensing UE may exclude reserved resources of Type (c) from selection and select other available resources from the RP 100 such as the TFRP pool, in order to avoid conflict with resources reserved for Type (c).

In some examples, if the value of P(c) is lower than a predefined threshold, the sensing UE may decide not to exclude Type (c) resources from selection, in which case the sensing UE may select available resources from the RP 100 that includes Type (c) resources.

Thus, in these examples the sensing UE determines the priority values or priority levels based on received/sensed information and recognized reservation type used and indicated by other UEs.

In some other examples, the priorities, such as priority values or priority levels, may be indicated in an SCI or a DMRS and obtained by the sensing UE once the SCI or DMRS is decoded.

In some other examples, only the reservation type may be indicated in an SCI or a DMRS and obtained by the sensing UE once the SCI or DMRS is decoded, and then the sensing UE may determine or calculate a priority value or an exclusion threshold associated with the sensed reservation type.

In some examples, the priority value or the priority level of the data packet, $P_d$, may be determined according to a per-packet QoS model based on both ProSe Per-Packet Priority (PPPP) and ProSe Per-Packet Reliability (PPPR). The value of PPPP can be the priority value/level used to address a number of QoS-related physical layer issues, such as resource reservation and packet conflict. The value of $P_d$ may be obtained from a higher layer parameter configured to the UE.

In some examples, in the resource selection procedure, the sensing UE may select both resources for initial transmission and resources for later retransmissions. For example, the sensing UE may select a TFRP to carry out both the initial transmission and blind retransmissions of a TB.

In some examples, the reservation Type (a1) may include a type of reservation for future TBs that is similar to a long-term sensing and semi-persistent transmission scheme in LTE V2X, which is employed for resource reservation. Under Type (a1) reservation, when a transmission is performed at time $t_0$, frequency location $f_0$, the sensing UE may expect that the transmitting UE will continue to use the reserved resource at $t_0$+nx RSVP, n=1, 2, . . . , at the same frequency location $f_0$. Thus, the sensing UE can try to avoid the resources that fall into the selection window.

When the reservation Type (a1) is indicated, after a selection of the resources, the sensing UE may keep using the same resources periodically until a re-selection is triggered. This type of transmission scheme may be referred to as a semi-persistent transmission scheme. When the re-selection is triggered, the UE may re-perform the resource selection procedure and select a different resource set. There are different kinds of events that may trigger a reselection, which may include an instance in which a delay requirement of data packets cannot be satisfied. The RSVP may be indicated in the SCI associated with data transmission. The reservation period may also be (pre)-configured or pre-defined without indicating transmissions.

When a semi-persistent transmission scheme is applied, the reservation resources might not be used during the reservation period. For example, if a transmitting UE does not have any packet to transmit in the future, or a reselection has been triggered and the transmitting UE selects different resources for a subsequent transmission, the reserved resources may still be available, which may not be indicated by the sensed indication signal. Therefore, the reservation for the semi-persistent transmission scheme may not be as certain as the reservation for blind retransmission.

An example embodiment of SL V2X resource allocation according to the methods describes above will now be described.

Figure 2:
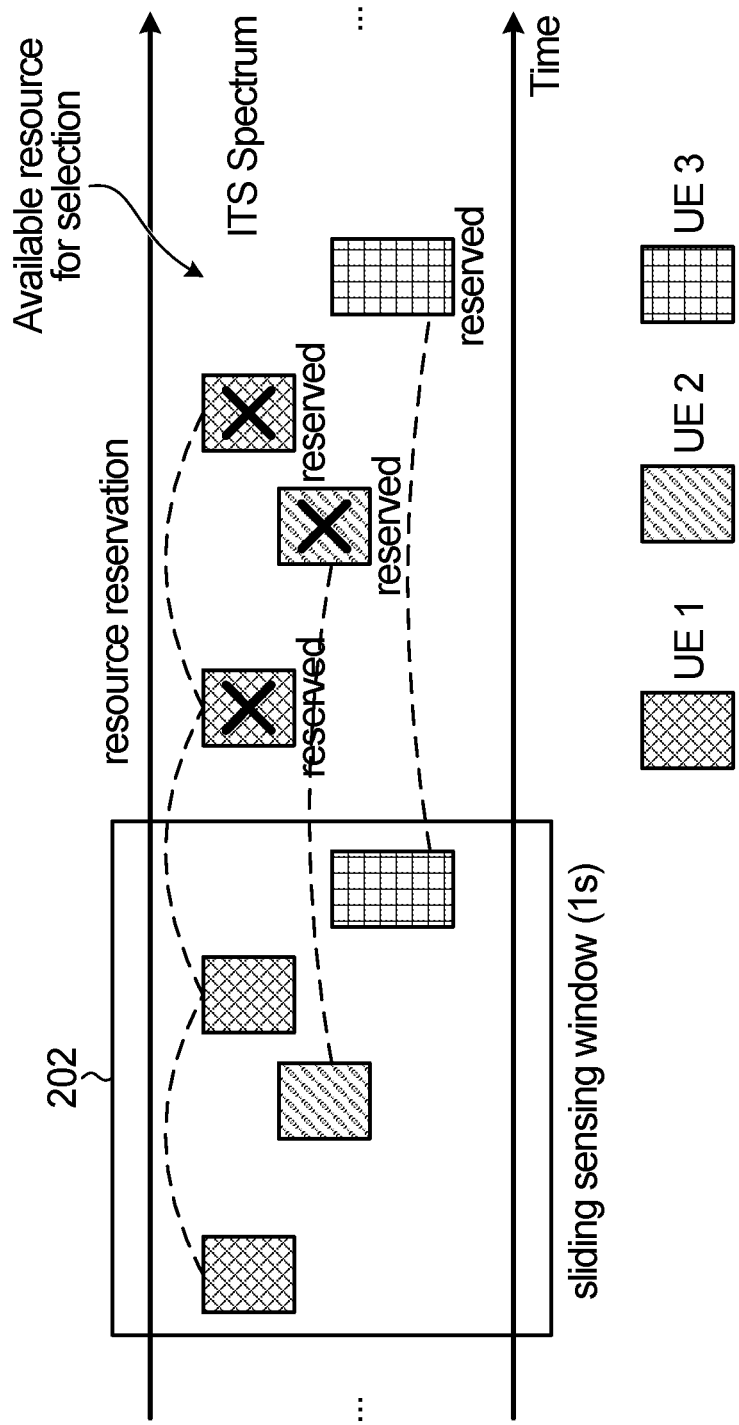
FIG. 2 is a schematic diagram illustrating an example of sensing and resources selection for different UEs.

FIG. 2 illustrates an SL communication resource sensing and reservation method in the context of a frequency (y-axis) and time (x-axis) plot. Transmission resources associated with three respective UEs (UE1, UE2 and UE3) are shown as time-frequency blocks within a sliding sensing window 202 and a resource reservation period (e.g., resource selection period). In the example embodiment, vehicle UEs are synchronized, which enables sensing and resource reservation/selection for V2X traffic. SCI decoding, PSSCH DMRS detection and SL measurement can be used for sensing other UE transmissions. Explicit reservation in SCI or implicit indication via PSCCH/PSSCH DMRS by a transmitting (Tx) UE for a receiving (Rx) UE can indicate the next TB or TBs which can also be used by other UEs for resource selection and exclusion.

In example embodiments, UE1 applies a sliding sensing window 202. The sensing window is defined as a window of length T preceding a packet arrival in which the packet is ready for transmission. The length of the sensing window can be predefined or configured/preconfigured for the resource pool. In the case of a TFRP pool that is explicitly defined with a periodicity, the length of the sensing window can be a multiple of the TFRP periodicity. Within the sliding sensing window 202, UE1 continuously performs one or more of the following sensing actions to collect sensing information:

(i) monitor for and decode the SCIs transmitted from other UEs such as UE2 and UE3 SCIs;
(ii) perform DMRS blind detection;
(iii) measure PSSCH power or energy corresponding to candidate resources by measuring PSSCH RSRP corresponding to candidate resources. The PSSCH RSRP may be measured using DMRS, e.g., PSSCH RSRP may be defined as the linear average over power distribution of the resource elements that carry DMRS. In some other embodiments, PSSCH RSRP may be measured using other reference signals or data signals
(iv) Optionally measure power or energy of an alternative signal. For example, sidelink received signal strength indicator (S-RSSI) can be measured, which is a measurement of PSSCH total energy S-RSSI that may be defined as the linear average of total received power per OFDM symbol observed in the configured sub channel by the UE. For the sensing process, the S-RSSI can be the linear average of samples in a sensing window based on a fixed or configured periodicity.

Figure 3:
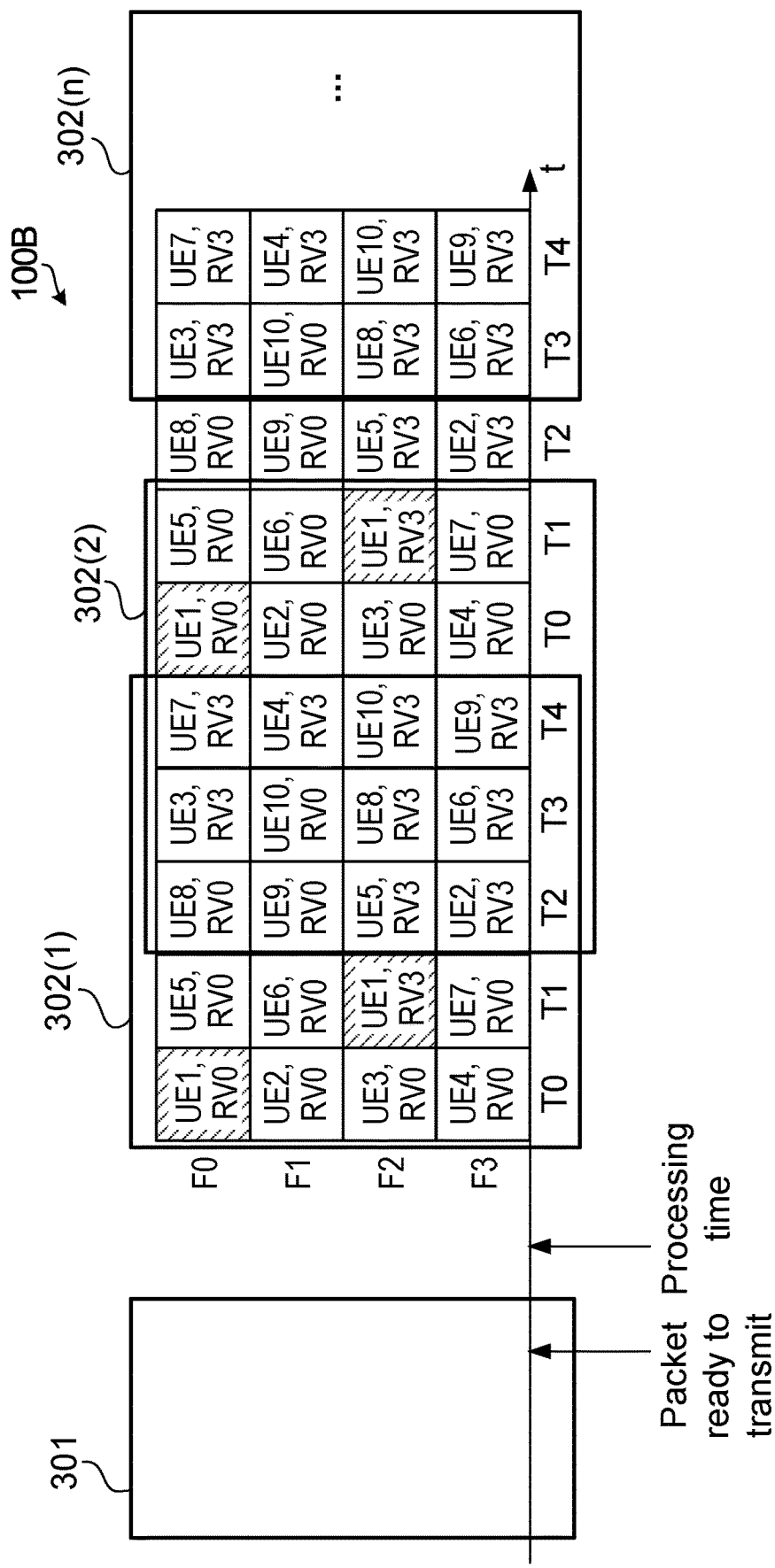
FIG. 3 is a schematic diagram illustrating an example of resource selection using sensing windows.

FIG. 3 shows another example configuration of a TFRP pool. In one embodiment of resource pool (RP) configuration, the time frequency resources that can be used for SL transmission are defined, e.g., the RP configuration may include the boundary and division of frequency subchannels, e.g., F0, F1, F2, F3 as shown in FIG. 3, and the available time slots that can be used for SL transmission. There might be no explicit definition of a transmission pattern pool or TFRP pool, which means a sensing UE may select any combination of resources that are used for initial transmission and retransmission if needed for a TB, which forms a transmission pattern or TFRP. In another embodiment, a transmission pattern pool or TFRP pool may be further defined within the resource pool, which limits a certain number of resource combinations that UE can choose for initial transmission and retransmission of a TB, i.e., the sensing UE can choose a specific TFRP among the configured TFRP pool.

As shown in FIG. 3, a sensing window 301 and a set of selection windows 302(1)-(n), which are also collectively referred to as a selection window 302, are applied in RP 100 with a periodicity that is greater than 1. As shown in the example of FIG. 3, a sensing UE can detect other UEs' transmission or performance measurements in the sensing window 301. When the data packet or TB arrives, the sensing UE may perform resource selection or reselection within a resource selection window. The resource selection window may be chosen to start at a given time such as T1 after the resource selection or reselection is triggered. T1 may typically be equal to or larger than the UE's processing time so the UE has sufficient time to perform the selection and prepare for the transmission. T1 may be predefined or configured/preconfigured. The configuration may be done within resource pool configuration.

If a transmission pattern pool or TFRP pool is configured/defined as shown in FIG. 1A and FIG. 3, a sensing UE may select a transmission pattern among a transmission pattern pool or select a TFRP among a TFRP pool. The sensing UE may need to select all the transmission resources for a TB at the same time. The sensing UE can select a TFRP within the resource selection window.

There are at least two approaches for determining the resource selection window. In a first approach, the starting location of the TFRP window is considered to be fixed. In this case, the resource (re)selection window starts at the first TFRP window that is later than $T_s>=0$ after the resource (re)selection is triggered. In a second approach, the selection window is set to start at any time slot, i.e., the selection window can start at any time slot where Ts>=0 after the resource (re)selection is triggered. The resource selection window length can be equal to the TFRP window length, or the periodicity, or a multiple thereof.

The TFRP pool can be configured in the following manner. In the RP configuration, a periodicity, offset, number of repetitions and the RV sequence corresponding to the repetitions may be configured. The size, granularity, boundaries and division of time/frequency resources may also be configured in the RP. For example, as shown in FIG. 3, F0 to F3 may be configured/defined as one or multiple frequency subchannels, where size and boundary of frequency subchannels are configured for each RP. In time domain, the granularity may be defined as one or multiple slots, e.g., T0, T1, T2, T3, T4, can each represent one slot. The pattern index (UE index as shown in FIGS. 1 and 3) and corresponding location can be predefined or derived from the configured parameters (periodicity, offset, number of repetitions, RV sequence, frequency and time resource division etc.) based on a given rule. FIG. 1A shows an example of such TFRP pool definition, in which no two patterns share the same slot number for both repetitions, and for every pair of two patterns the allocated resources do not completely overlap. In the example of FIG. 1A, the periodicity is 5 slots, spans from T0 to T4 and the pattern repeats periodically. The starting slot is the time location of T0. The pattern repeat itself periodically with the configured/predefined periodicity as shown in FIG. 3.

FIG. 3 illustrates two examples of resource selection corresponding to whether the starting slot of the selection window is flexible. If the starting location of a pattern pool is not flexible, the sensing window can start at beginning of T0 or T0+n*periodicity where n is an integer. In the example of FIG. 3, the resource selection window can be 302(1). If the starting location of pattern pool is not flexible, the sensing window can start at any slot (e.g. T0, T1, T2, T3, T4. The sensing UE then starts to select resources at any start point within a selection window 302. In this example, a start point of a selection window 302 can be varied along the time axis, such as T0, T2, or T3 based on any suitable situation. In this example, the resource selection window can be 302(1), 302(2), . . . , 302(n) etc.

In other examples, the length of the selection window may also be varied based on any suitable configuration. In some embodiments, the length of the selection window can be restricted to be equal to the TFRP window length or periodicity or multiple thereof. In some other embodiments, the length of selection window may not have such constraint. The length of the selection window may also be determined and bounded by the delay constraint of the data packets/traffic that UE plans to transmit. In some examples, the resource selection may be a TFRP selection. The TFRP selection may be performed at least once within a periodicity of a configured grant resource. Configuring a pool of the (pre)-configured TFRPs should enable that any two distinct TFRPs do not collide in at least one time unit, in order to alleviate a half-duplex constraint, which may help to avoid detrimental impacts. Such a method to configure the selection window may help to avoid extra delays for resource selection compared with conventional approaches in which a start point of a selection window has been set at a fixed location (e.g., always fixed at T0).

It is noted that, as shown in FIG. 3, to support the flexible starting location of the resource selection window, a sensing UE may be allowed to perform repetition at a flexible starting location. The flexible starting location of repetition means that instead of following the time order of transmission/repetition of the same TB as defined in the transmission pattern pool or TFRP pool, the sensing UE can start transmission/repetition of a TB at any transmission resource that belongs to the transmission pattern or TFRP. The UE may still perform the same number of repetitions for each TB. For example, with respect to UE5, if the sensing UE selects a transmission pattern corresponding to UE5 when the resource selection window corresponding to 302(1) as shown in FIG. 3 is chosen, the sensing UE starts the initial transmission at the time frequency resource corresponding to (T1, F0) for the initial transmission for the TB and (T2, F2) for the second repetition or retransmission of the TB within window 302(1). If, instead, the sensing UE chooses the transmission pattern corresponding to UE5 when the resource selection window corresponding to 302(2) in FIG. 3 is chosen, the sensing UE then starts the initial transmission for the TB at time frequency location (T2, F2) and performs retransmission/$2^{nd}$ repetition of the TB at time frequency location (T1, F0) within window 302(2). The (T1, F0) in window 302(2) is one period later than the (T1, F0) in window 302(1). If such flexible starting location of repetition/retransmission is supported, the receiver or sensing UE may need to know 1) whether the current transmission is an initial transmission or retransmission or 2) which number (index) of transmission/repetitions among all repetitions the current transmission belongs to. This information can be either indicated in the sidelink control information (SCI) or indicated using DMRS via any DMRS properties similar to those previously described to indicate the transmission pattern.

In some examples, UE1 may perform sensing via DMRS blind detection before a packet arrival. The sensing window (e.g., the sensing window 301) is defined as a window of length T preceding the packet arrival. The length of the sensing window can be configured or preconfigured for the resource pool, and can be a multiple of the TFRP periodicity.

In some examples, based on sensing results obtained within the sensing window, a UE performs resource selection within a resource selection window. Because a UE needs to select all the transmission resources for a TB at the same time, the UE should select a TFRP within the resource selection window. There are two methods to determine the resource selection window: In the first approach, the starting location of the TFRP window is considered to be fixed. In this case, the resource (re)selection window starts at the first TFRP window that is later than T1>=0 after the resource (re)selection trigger. In the second approach, the resource selection window is defined to start at any slot, i.e., the selection window starts T1>=0 after the resource (re)selection trigger. The resource selection window length can be equal to the TFRP window length, or the periodicity, or a multiple thereof.

In some examples, once the UE determines the resource selection window, it should select a TFRP within the resource selection window such that it tries to avoid TFRPs reserved through Type (b) reservation and TFRPs conflicting with retransmission resources indicated by other UEs using Type (a1) and Type (c) reservations. With the three reservation types (a1), (b), and (c), listen-before-talk (LBT) type of short-term sensing is not needed in NR V2X, because it may further increase the energy consumption and complexity of the sensing procedure.

Before the initial transmission of a TB, the sensing UE may continue sensing based on DMRS blind detection to further check if the selected TFRP has any conflict with, e.g., Type (a1), and Type (c) retransmission reservations. If a conflict is found, the UE will reselect or select a different TFRP within a same (re)selection window.

Figure 4:
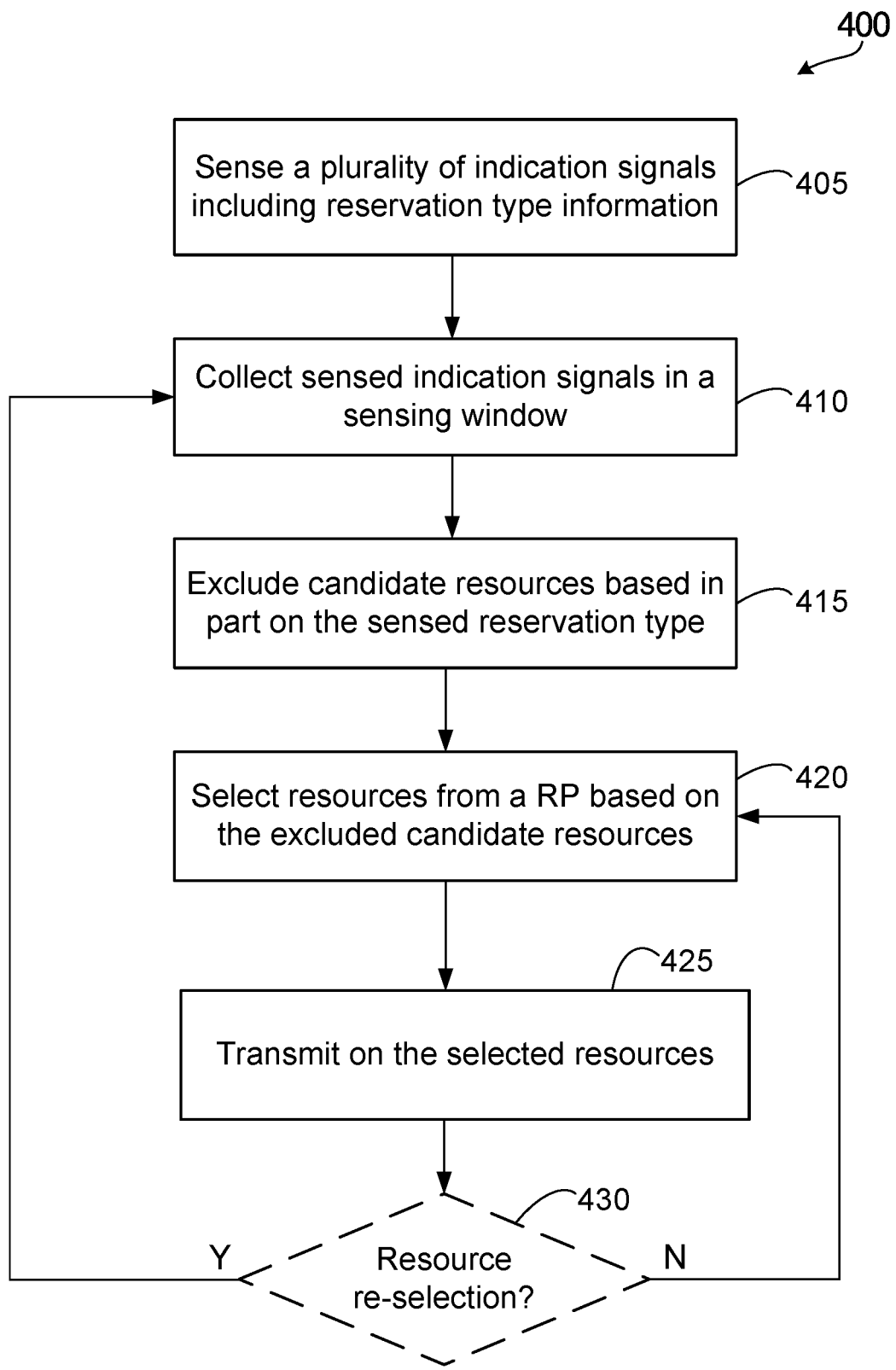
FIG. 4 is a flow diagram illustrating an example of a resource selection method.

FIG. 4 illustrates a method 400 for resource selection according to example embodiments, including a sensing and resource exclusion/resource selection process based on priorities of different reservation types. Such a method may be applied in a sensing and resource selection procedure. The method 400 is described below:

At step 405: A plurality of indication signals are sensed. The indication signals may include other UEs' scheduling assignment (SA) in a sidelink control information (SCI), or a DMRS. Each sensing UE keeps decoding other UEs' SCI and/or measures corresponding PSSCH energy and/or measures PSSCH RSRP based on DMRS or measure S-RSSI as described above. The PSSCH RSRP may be measured at a corresponding PSSCH resource when an SCI or DMRS is detected. The indication signals include reservation type information and optionally other information related to selection and reservation of SL resources as discussed above.

At step 410: The sensed information obtained from the reservation indication signals and SL measurements (e.g. PSSCH RSRP or S-RSSI) that are within the sensing window are collected. That means, even a UE senses a large number of indication signals all the time, only information such as indication signals, sensed within the sensing window, will be collected for resource selection. The sensed indication signal may include information regarding PSSCH blind detection, PSSCH DMRS RSRP and SL RSSI measurement. The sensed indication signals also include reservation type information or other optional information as discussed earlier.

At step 415: Candidate resources are excluded from a candidate resource set. The exclusion of candidate resources is now discussed in greater detail. A sensing UE first determines a resource selection window and forms a set of resources within the resource selection window as a candidate resource set that the sensing UE may select from. If the pattern pool or TFRP pool is configured/defined, the TFRP pool within the resource selection window is the candidate resources set and UE may select a TFRP among the TFRP pool.

After the candidate resource set is formed, the UE needs to exclude some candidate resources that may be colliding or have conflict with other UEs' potential transmissions from the candidate resource set. It is noted that not all potential collisions have the same impact on the UE's resource selection, because if a UE's data transmission has high energy when received by the sensing UE, it has much higher impact than a UE's data transmission with lower energy. Therefore, the sensing UE (blindly) may decode SCI, or DMRS or any other indication signal at potential locations within a sensing window. If an SCI is decoded or a DMRS or any other indication signal is detected to indicate there are associated data or PSSCH transmissions, the sensing UE further measures the corresponding PSSCH RSRP for that PSSCH resource. PSSCH RSRP represents how much power or energy is detected in a received reference signal. If the PSSCH RSRP is larger than a determined threshold Th, the corresponding reserved resources within the resource selection window or candidate resource set should be excluded. If the RSRP is lower than the determined threshold, the corresponding reserved resource is not excluded. In some examples, whether to exclude resources reserved for different reservation types may be determined differently. For example, for long term reservation using signaling associated with a previous TB, the resource located at the time slot $t=t_0+n*RSVP$ or $t=t_0+n*periodicity$, and at the same frequency location as the detected PSSCH resource that falls in the resource selection window, may be excluded, where RSVP is the reservation period and the "periodicity" is the periodicity of the pattern pool or the TFRP pool if the TFRP is configured. RSVP can be fixed, predefined, configured or preconfigured in the RP or indicated in the indication/reservation signal (e.g. SCI or DMRS). When a fixed number (e.g., m) of TBs is reserved, only a number between 1 to m that falls within the resource selection window may be excluded. In the case of reservation of blind retransmission or HARQ feedback based retransmission of the same TB, only the reserved retransmission resource that falls within the resource selection window will be excluded.

The resources may be excluded based on the reservation priorities or exclusion thresholds determined based on the sensed reservation type as described herein.

Figure 7:
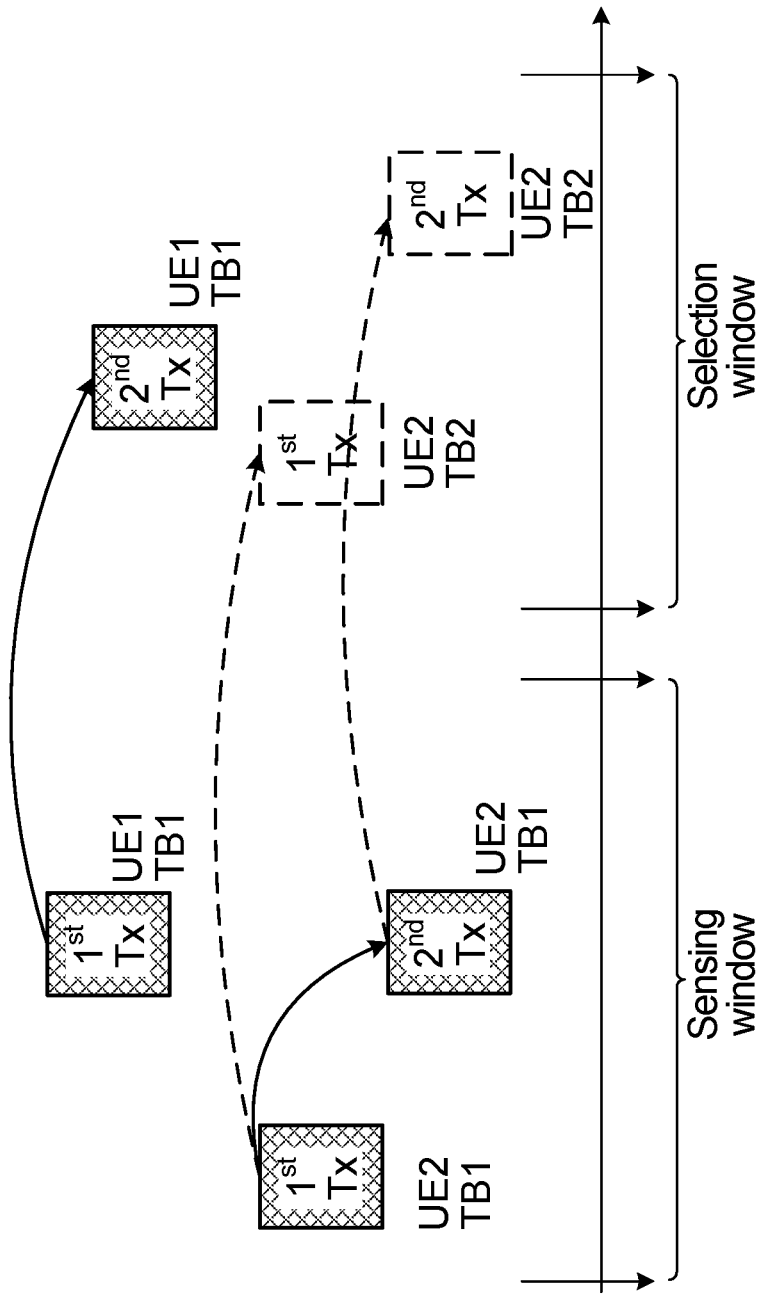
FIG. 7 is a schematic diagram illustrating an example of resource exclusion within a selection window.

FIG. 7 illustrates a process to exclude resources within a resource selection window. For illustration purposes, two different types of resource reservations are represented, one for reservation of a different TB, and one for reservation of retransmission of the same TB.

As discussed earlier, in some scenarios a sensing UE may increase or decrease the threshold Th for exclusion of resources such that less or more candidate resources will be excluded from the selection RP during selection. The lower the threshold Th, the more likely a potential candidate resource will be excluded from the candidate resource set. Thus, a reservation of resources with a higher priority from the perspective of the sensing UE should be associated with a lower threshold, so that the resource will be more likely excluded from selection of resources for other transmissions.

It follows that priority values or priority levels P(a1) to P(d) may be used to set the threshold Th of the RSRP. The priority level may be obtained by adjusting the packet priority of the reservation based on reservation type (e.g. multiplying it by a reservation type specific coefficient) Alternatively, the reservation types, such as Type (a) to Type (d), may be used to set or adjust the exclusion threshold Th directly.

Table 1 shows an example mapping relationship between priority and threshold. The left column shows different priority levels corresponding to the transmitted data of the sensing UE, which is performing sensing and resource selection. The top row of table 1 shows different priority levels corresponding to the other UE that is performing transmission/reservation. In this example, 4 different priority levels are defined. The number of different priority values defined is usually restricted to a certain number due to signaling overhead; however, this is illustrative. In some other examples, any number of different priority values may be applied. Table 1 shows depending on both a priority level of the sensing UE and a priority level of the reservation UE (e.g., a transmitting UE), thresholds Th1 to Th16 can be used. The threshold values Th1 to Th16 can be predefined or configured. The higher the priority level of the reservation UE, the lower the corresponding threshold may be used. In this example, assuming that level 4 has a priority higher than level 3 and level 3 has a priority high than level 2. We may have Th1>Th2>Th3>Th4 for the same level 1 data priority of sensing UE, similarly, Th5>Th6>Th7>Th8, etc.

TABLE 1

PRIORITY OF OTHER UE OR RESERVATION UE (DECODED IN SCI OR INDICATED BY DMRS, TAKING INTO ACCOUNT DIFFERENT RESERVATION TYPES)

| | | LEVEL 1 | LEVEL 2 | LEVEL 3 | LEVEL 4 |
|---|---|---|---|---|---|
| PRIORITY LEVEL OF SENSING UE | LEVEL 1 | TH1 | TH2 | TH3 | TH4 |
| | LEVEL 2 | TH5 | TH6 | TH7 | TH8 |
| | LEVEL 3 | TH9 | TH10 | TH11 | TH12 |
| | LEVEL 4 | TH13 | TH14 | TH15 | TH16 |

Table 2 shows an example mapping relationship between the reservation type and the exclusion threshold. The left column list different priorities of the sensing UE, similar to those shown in Table 1. The top row of Table 2 lists different reservation types. In this example, 4 different priority levels are listed, and 5 different reservation types are possible, resulting in 20 possible thresholds, Th1 to Th20.

Table 2 shows that, depending on both a priority level of the sensing UE and a reservation type of the resource reservation from the reservation UE or transmitting UE, different exclusion thresholds can be selected and used. Note that there may be a table including the mapping of the reservation type, the packet priority level of the other UE making the reservation, the packet priority of the sensing UE, to the RSRP threshold, i.e. the RSRP threshold depends on all 3 factors.

TABLE 2

|  |  | RESERVATION TYPE | | | | |
| --- | --- | --- | --- | --- | --- | --- |
|  |  | TYPE (A1) | TYPE (A2) | TYPE (B) | TYPE (C) | TYPE (D) |
| PRIORITY LEVEL | LEVEL 1 | Th1 | Th2 | Th3 | Th4 | Th5 |
|  | LEVEL 2 | Th6 | Th7 | Th8 | Th9 | Th10 |
|  | LEVEL 3 | Th11 | Th12 | Th13 | Th14 | Th15 |
|  | LEVEL 4 | Th16 | Th17 | Th18 | Th19 | Th20 |

The priority value of the reservation UE may be taken into account based on the different reservation types as described above. This can be implemented in various manners including the two approaches described earlier.

In one approach, the reservation UE or transmitting UE indicates the priority level of the corresponding data transmission $P_d$ in the reservation signal, such as SCI or DMRS, without considering the reservation type, and the sensing UE adjusts the priority value in view of the reservation type indicated in the indication signal.

For example, for reservation Type (a1), the sensing UE may obtain $P(a1)=a2*P_d$, where $a_2$ may be between 0 and 1, e.g. 0.5, and use P(a1) as the priority level of the reservation UE to find the corresponding threshold using Table 1.

In another approach, it is possible for the reservation UE to indicate a priority level Pi that has been selected in view of the reservation type in the indication signal transmitted to the sensing UE, such as the reservation signal SCI or DMRS. The sensing UE uses the priority level obtained from the reservation signal directly to find the corresponding threshold from Table 1. For example, if the reservation type is Type (a1), the priority level associated with the data transmission for the reservation UE is Pa, the reservation UE then calculates $P(a1)=a2*P_d$, where a2 is between 0 and 1, and indicates priority P(a1) in the reservation signal such as SCI or DMRS. Because the number of defined priority levels may be a maximum value, the P(b)–P(d) calculated above may be further quantized or mapped to the total number of priority values before indicating it in a reservation signal or used in Table 1 to find the threshold. For example, if a priority value/level is defined with level 1, 2, . . . n, instead of using $P(a1)=a2*P_d$, one may use P(a1)=floor(a2*Pd), P(a1)=ceiling(a2*Pd) or P(a1)=round(a2*Pd) to obtain the priority value P(a1) that takes account of the reservation type to ensure the final value of P(a1) is an integer and P(a1) provides a valid priority level.

A further approach is to find the corresponding threshold value Th from Table 2 based on the sensed reservation type as indicated in the reservation or indication signal.

In an embodiment, after determining an initial value of Th from a table such as Table 2 using the priority value from the sensed SCI, the value of Th may be adjusted at a later time. For example, the Th may be adjusted based on a reservation type. The Th may be adjusted by increase the Th by a certain amount (ΔTh). ΔTh may be dependent on the reservation type, and be different for different reservation types. A value of the ΔTh maybe predefined or (pre)configured for a specific reservation type.

Another method to use different priority values for resource exclusion includes ranking the priority values of all the reservation signals or indication signals detected within the sensing window in an ascending order. The candidate resources corresponding to the reserved resource may be excluded in the ascending order corresponding to a ranking of all the priority values of the corresponding reservation signals.

At step 420: a candidate resource from the candidate resources remaining in candidate resource set such as RP is selected based on the excluded candidate resources. In example embodiments, the candidate resource could be randomly selected from the remaining candidates within the RP. In another example, the remaining resource after exclusion may be ranked further based on S-RSSI measurement, and a subset of the remaining resources is selected. The subset may be a fixed percentage of total resources, e.g., 20%. After the subset of resources is selected, the UE may randomly select a resource or resources or a TFRP among the subset of selected resources.

At step 425: data such as a TB is transmitted on the selected resources according to traffic arrival at the transmitting UE, Tx UE.

Optionally, at step 430: if it is determined that resource re-selection is needed, restart to the sensing and selection process. If resource re-selection is not needed, data transmission is performed on the same selected resources.

In some examples, re-selecting a resource may be performed in other situations, i.e. perform another resource selection according to the above procedure if any of the following triggers occur: transmission opportunities run out; UE consecutively misses a number of transmission opportunities; and the current resource selection cannot meet the latency requirement.

In example embodiments, as an alternative approach of the sensing procedure based on SCI, PSSCH-RSRP can be measured based on the DMRS of PSSCH and used to determine a number of other UEs that have reserved the resource. The alternative approach may be used, for example, when no SCI is associated with data or when an SCI and its associated data are transmitted in the same slot.

A candidate resource in the resource pool can be excluded if either one of the two following conditions are met:
  Condition 1: the candidate resource is (i) explicitly indicated or reserved by a decoded SCI and (ii) the PSSCH-RSRP in the associated PSSCH data resource is above a exclusion threshold that is determined based on the corresponding priority, P(b)–P(d), when the number of decoded SCIs for which the PSSCH-RSRP in the associated PSSCH data resource is above a threshold is larger than L.

Condition 2: the candidate resource is implicitly indicated or reserved by a blindly detected PSSCH DMRS, when the number of such blindly detected DMRSs is larger than L. No SCI is needed in this case.

In some embodiments, L=0. When L=0, as long as one UE reserved a resource for transmission, the reservation of the resource will be taken into account.

After the resources are selected from the resource selection window or TFRP is selected from the TFRP pool within the resource selection window and before the initial transmission of a TB, the sensing UE will continue sensing based on sensing the reservation signal, e.g. DMRS blind detection or SCI detection, to further check if the selected resource or TFRP has any conflict with retransmission reservations, such as Types (ii) and (iii) reservations. If a conflict is detected, the sensing UE will (re)select a different resource or TFRP from a RP within the same (re)selection window.

Once UE determines the resource selection window, it should select transmission and retransmission resources (or a TFRP) within the resource selection window. In order to select the transmission resources to be used (or TFRP), the UE first creates a candidate resource pool (in the case of TFRP selection, it can be a TFRP pool including all possible TFRPs within the resource selection window). A resource (or TFRP) is not considered as a candidate resource if the resource (or TFRP) is indicated in a received SCI and the associated L1 SL-RSRP measurement is above an SL-RSRP threshold. UE then selects the resources (or a TFRP) from among the remaining candidate resources (or TFRPs).

If a TFRP can be partially overlapped with another TFRP (e.g., the TFRP pool in FIG. 8 of [6]), then the resource selection can be further optimized. Within the remaining candidate TFRPs, a TFRP should be selected based on the following order of preference:
1. All resources of the TFRP are not in conflict with any reserved resources.
2. Initial/first transmission resource of the TFRP does not conflict, but retransmission resources may conflict with reserved resources.
3. Initial/first transmission resource of the TFRP conflicts with reserved resources, but at least one retransmission does not overlap with the reserved resources.

The UE may select the combination of transmission/retransmission resources similarly: Within the remaining candidate resources, a combination of transmission and retransmission resources should be selected based on the following order of preference:
1. All resources of the transmission/retransmission are not in conflict with any reserved resources.
2. Initial/first transmission resource of the TB does not conflict, but retransmission resources may conflict with reserved resources.
3. Initial/first transmission resource of the TB conflicts with reserved resources, but at least one retransmission does not overlap with the reserved resources.

Before the initial transmission of a TB, the UE shall continue sensing based on SCI decoding to further check if the selected resources (or TFRP) have any conflict with retransmission reservations. If a conflict is found, the UE should (re)select different resources (or a different TFRP) within the same (re)selection window. If there is available resource located in the same time slot but in different frequency subchannels from previously selected resources that are not in conflict, then the sensing UE should simply adjust the frequency sub channel of the initial transmission resource without reselecting the time slot for the initial transmission. This is because if the same time slot of initial transmission is selected, UE does not need to do further sensing, avoiding unnecessary delays.

One advantage of TFRP based resource selection is taking into account the combination of different transmission resources for the same TB in the resource selection. In high load scenarios, such design allows UEs to successfully decode a TB in spite of incurring some partial collisions. In comparison, selection based on individual resources may incur delays because a sensing UE may keep (re)selecting resources if it fails to find non-conflicted resources for all transmissions of a TB.

Apparatus Descriptions

FIG. 5 is a block diagram illustrating an example of a telecommunications network 500 according to one embodiment, for implementing any one or combination of two or more of the above described methods. The telecommunications network 500 includes a core network 502 and an access network 506. The access network 506 serves a plurality of UEs 504a, 504b, 504c, 504d, 504e, 504f, 504g, 504h, and 504i. The access network 506 could be an Evolved Universal Terrestrial Access (E-UTRA) network. As another example, the access network 506 could be a cloud access network (C-RAN). The access network 506 includes a plurality of BSs 508a, 508b, and 508c. The BSs 508a-c each provides a respective wireless coverage area 510a, 510b, and 510c. Each of the BSs 508a-c could be implemented using a radio transceiver, one or more antennas, and associated processing circuitry, such as antenna radio frequency (RF) circuitry, analog-to-digital/digital-to-analog converters, etc.

Although not illustrated, the BSs 508a-c are each connected to the core network 502, either directly or through one or more central processing hubs, such as servers. The BSs 508a-c could serve as a gateway between the wireline and wireless portion of the access network 506.

Each one of BSs 508a-c may instead be referred to as a base transceiver station, a radio BS, a network node, a transmit node, a transmit point, a Node B, an eNode B (eNB), a gNodeB, or a remote radio head (RRH), depending upon the implementation.

In operation, the plurality of UEs 504a-i access the telecommunications network 500 using the access network 506 by wirelessly communicating with one or more of the BSs 508a-c.

UEs 504a-d are in close proximity to each other. The UEs 504a-d can each wirelessly communicate with the BS 508a. The UEs 504a-d can also directly communicate with each other, as represented at 516. Communications 516 may also be referred to as lateral communications. In embodiments disclosed herein, UE to UE communications use a SL channel and a SL air interface. On the other hand, a communication between an access network component, such as BS 508a, and a UE, as in communication 55, is called an access communication. The access communication occurs over an access channel, which can be a UL or DL channel, and the access communication uses a radio access communication interface, such as a cellular radio access air interface. Access and SL air interfaces may use different transmission formats, such as different waveforms, different multiple access schemes, and/or different radio access technologies. Some examples of radio access technologies that could be used by an access air interface and/or a SL air interface are: Long Term Evolution (LTE), LTE License Assisted Access (LTE-LAA), 5G New Radio, and WiFi.

By using the SL communications 516, the UEs 504a-d may be able to assist with wireless communications between the UEs 504a-d and the BS 508a. As one example, if UE 504c fails to correctly decode a packet received from the BS 508a, but if UE 504d is able to receive and correctly decode the packet from the BS 508a, then UE 504d could directly transmit the decoded packet to UE 504c using SL communications 516. As another example, if UE 504c moves out of wireless coverage area 510c, such that UE 504c can no longer wirelessly communicate with the BS 508a, then UE 504b could forward messages between the UE 504c and the BS 508a. As another example, UE 504a and UE 504c could both receive a signal transmitted from the BS 508a that carries a packet meant for UE 504c. UE 504a may then transmit to UE 504c, via SL communications 516, the signal as received by UE 504a. UE 504c may then use the information received from UE 504a to help decode the packet from the BS 508a. In these examples, capacity and/or coverage may be enhanced through the assistance of UEs 504a, 504b, and/or 504d. V2X communications as referenced herein are an example of SL communications.

The UEs 504a-d form a UE group 520. The access network 506 could assign a group identifier (ID) to the UE group 520. The UE group ID may allow the access network 506 to address the UE group 520 as a whole and distinguish the UE group 520 from other UE groups. The UE group ID may also be used to broadcast information within the UE group, i.e. address all other UEs within the UE group 520. The UE group 520 may form a logical or virtual device mesh in which the members of the UE group 520 communicate amongst themselves using UE communications over an SL air interface. The UE group 520 as a whole can act as a single distributed virtual transceiver with respect to the access network 506. The UE group ID may be a group radio network temporary identifier (G-RNTI), for example.

When a particular UE in the UE group 520 is being assisted or is to be assisted with wireless communication between that UE and the BS 508a, then that particular UE is referred to as the target UE (TUE). In the examples above, UE 504c is being assisted and is therefore a TUE. The other UEs 504a, 504b, and 504d in the group 520 form a cooperation candidate set, which is a set of UEs that may cooperate to help the TUE 504c. The subset of UEs in the cooperation candidate set that actually assist the target UE 504c form a cooperation active set. The cooperation active set may be dynamically selected to assist the target UE 504c. The UEs in the cooperation active set are referred to as cooperating UEs (CUEs). In UE group 520, UEs 504a, 504b, and 504d form the cooperation candidate set. If UEs 504a and 504b actually assist target UE 504c, then UEs 504a and 504b form the cooperation active set and are the CUEs. As UEs 504a-d move around, some may leave the UE group 520 and/or other UEs may join the UE group 520. Therefore, the cooperation candidate set may change over time, e.g., the cooperation candidate set may change semi-statically. The UE group 520 may also be terminated by the network 506, e.g., if the network determines that there is no longer a need or opportunity for the UE group 520 to provide assistance in wireless communication between the BS 908a and members of the UE group 520.

There may be more than one UE group. For example, UEs 504e and 504f in FIG. 5 form another UE group 522.

Figure 6:
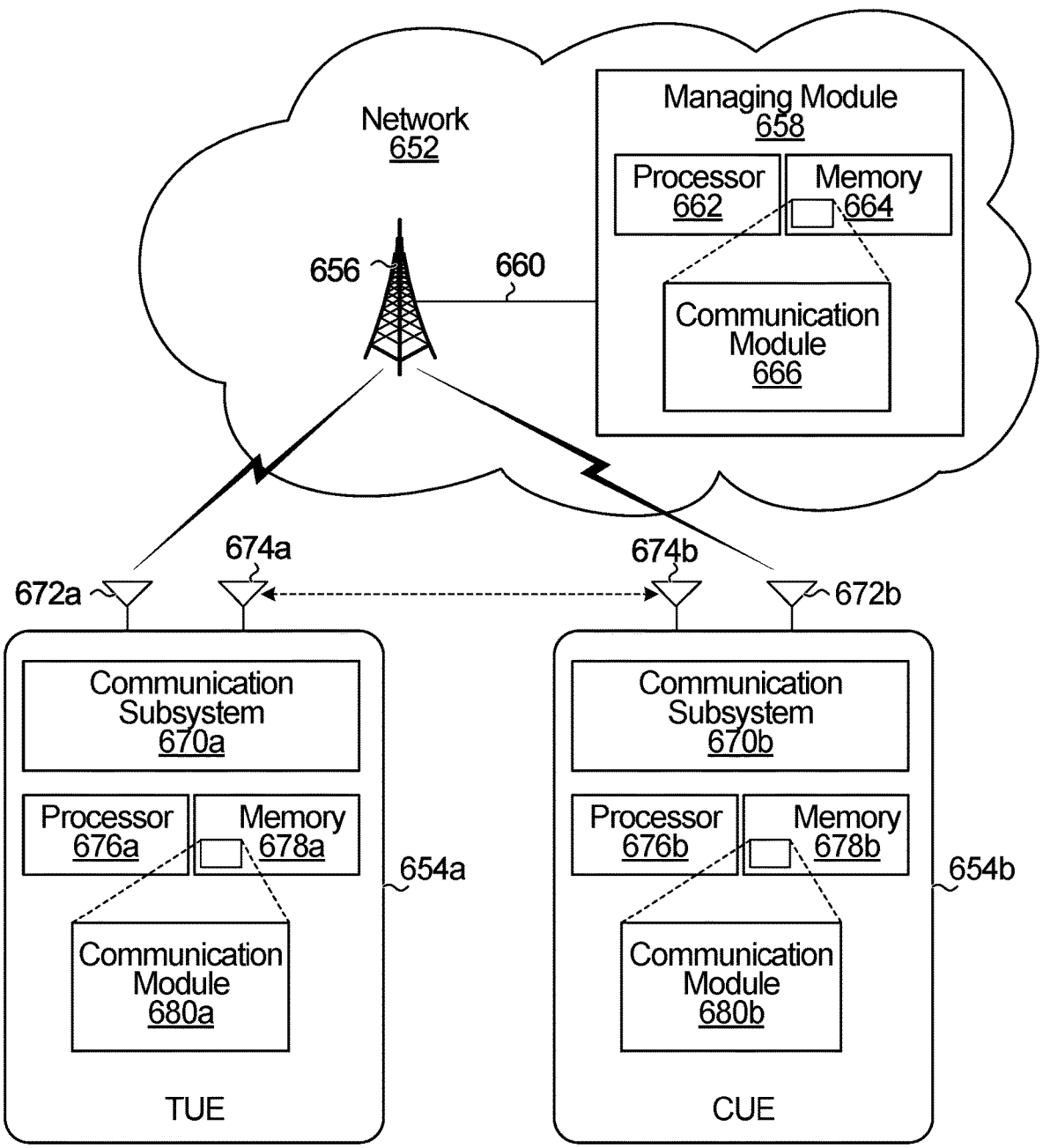
FIG. 6 is a block diagram illustrating an example of a network serving two UEs.

FIG. 6 is a block diagram illustrating an example of a network 652 serving two UEs 654a and 654b, according to one embodiment. The network 652 may be the access network 1406 from FIG. 5, and the two UEs 654a and 654b may be two of the four UEs 1404a-d in FIG. 5. However, more generally this need not be the case, which is why different reference numerals are used in FIG. 6.

The network 652 includes a BS 656 and a managing module 658. The managing module 658 instructs the BS 856 to perform actions. The managing module 858 is illustrated as physically separate from the BS 656 and coupled to the BS 656 via a communication link 660. For example, the managing module 658 may be part of a server in the network 652. Alternatively, the managing module 658 may be part of the BS 656.

The managing module 658 includes a processor 662, a memory 664, and a communication module 666. The communication module 666 is implemented by the processor 662 when the processor 662 accesses and executes a series of instructions stored in the memory 664, the instructions defining the actions of the communication module 666. When the instructions are executed, the communication module 666 causes the BS 656 to perform the actions described herein so that the network 652 can establish, coordinate, instruct, and/or control a UE group. Alternatively, the communication module 666 may be implemented using dedicated circuitry, such as an application specific integrated circuit (ASIC) or a programmed field programmable gate array (FPGA).

The UE 654a includes a communication subsystem 670a, two antennas 672a and 674a, a processor 676a, and a memory 678a. The UE 654a also includes a communication module 680a. The communication module 680a is implemented by the processor 676a when the processor 676a accesses and executes a series of instructions stored in the memory 678a, the instructions defining the actions of the communication module 680a. When the instructions are executed, the communication module 680a causes the UE 654a to perform the actions described herein in relation to establishing and participating in a UE group. Alternatively, the module 680a may be implemented by dedicated circuitry, such as an ASIC or an FPGA.

The communication subsystem 670a includes processing and transmit/receive circuitry for sending messages from and receiving messages at the UE 654a. Although one communication subsystem 670a is illustrated, the communication subsystem 670a may be multiple communication subsystems. Antenna 672a transmits wireless communication signals to, and receives wireless communications signals from, the BS 656. Antenna 674a transmits SL communication signals to, and receives SL communication signals from, other UEs, including UE 654b. In some implementations there may not be two separate antennas 672a and 674a. A single antenna may be used. Alternatively, there may be several antennas, but not separated into antennas dedicated only to SL communication and antennas dedicated only to communicating with the BS 656.

SL communications could be over Wi-Fi, in which case the antenna 674a may be a Wi-Fi antenna. Alternatively, the SL communications could be over Bluetooth™, in which case the antenna 674a may be a Bluetooth™ antenna. SL communications could also or instead be over licensed or unlicensed spectrum.

The UE 654b includes the same components described above with respect to the UE 654a. That is, UE 654b includes communication subsystem 670b, antennas 672b and 674b, processor 676b, memory 678b, and communication module 680b.

The UE 654a is designated as a target UE (TUE) and will therefore be called TUE 654a. The UE 654b is a cooperating UE and will therefore be called CUE 254b. The CUE 654b may be able to assist with wireless communications between the BS 656 and TUE 654a if a UE group were to be established that included TUE 654a and CUE 654b. Other communication scenarios are also contemplated, in a V2X application, for example.

The UE 654a may be specifically chosen as the target UE by the network 652. Alternatively, the UE 654a may itself determine that it wants to be a target UE and inform the network 652 by sending a message to the BS 656. Example reasons why UE 654a may choose or be selected by the network 652 to be a target UE include: low wireless channel quality between the UE 654a and the BS 656, many packets to be communicated between the BS 656 and the UE 654a, and/or the presence of a cooperating UE that is a good candidate for helping with communications between the BS 656 and the UE 654a.

UE 654a need not always stay a target UE. For example, UE 654a may lose its status as a target UE once there is no longer a need or desire for assistance with wireless communications between UE 654a and the BS 656. UE 654a may assist another target UE that is a cooperating UE at a later time. In general, a particular UE may sometimes be a target UE and other times may be a cooperating UE assisting another target UE. Also, sometimes a particular UE may be both a target UE receiving assistance from one or more cooperating UEs and also a cooperating UE itself assisting another target UE. In the examples below, the UE 654a acts only as a target UE, i.e., TUE 654a, and the UE 654b is a cooperating UE to the TUE 654a, i.e., CUE 654b.

FIGS. 5 and 6 illustrate systems in which embodiments could be implemented. In some embodiments, a UE includes a processor, such as 676a, 676b in FIG. 6, and a non-transitory computer readable storage medium, such as 678a, 678b in FIG. 6, storing programming for execution by the processor. A non-transitory computer readable storage medium could also or instead be provided separately, as a computer program product.

Further embodiments in this disclosure also relate to configuration, signaling and communication between a UE and a base station (BS), such as a 5G Node B (gNB), in uplink (UL) communication.

As discussed earlier, in some embodiments of SL communication between UEs, HARQ feedback information is utilized for selection and reservation of time frequency resources. For NR V2X UL communication in Mode 1, the transmit UE may need to report the HARQ feedback it received from receiving UE to the gNB, such that the gNB may schedule a retransmission if a NACK is reported. The SL HARQ feedback to the gNB can be transmitted in a PUCCH resource. The PUCCH resource for reporting HARQ feedback to the base station, gNB, is indicated in RRC signal for configured grant (CG) type 1 and in activation DCI in CG type 2.

As can be understood by those skilled in the art, in Type 1 CG, RRC may provide PUCCH resources for SL HARQ feedback reporting, periodicity, offset, time-frequency allocation, UE-specific DMRS configuration, MCS/TBS, #repetitions (K), power control, and the like. In Type 2 NR CG, RRC may provide periodicity, power control, the number of repetitions (K), and MCS/TBS (Transport Block Size); and the Activation DCI provides PUCCH resources for SL HARQ feedback reporting, time-frequency allocation, MCS/TBS, UE-specific DMRS configuration, and the like. The time domain offset of a resource refers to the offset with respect to a reference point (e.g. system frame number (SFN)=0 in the time domain).

Figure 9:
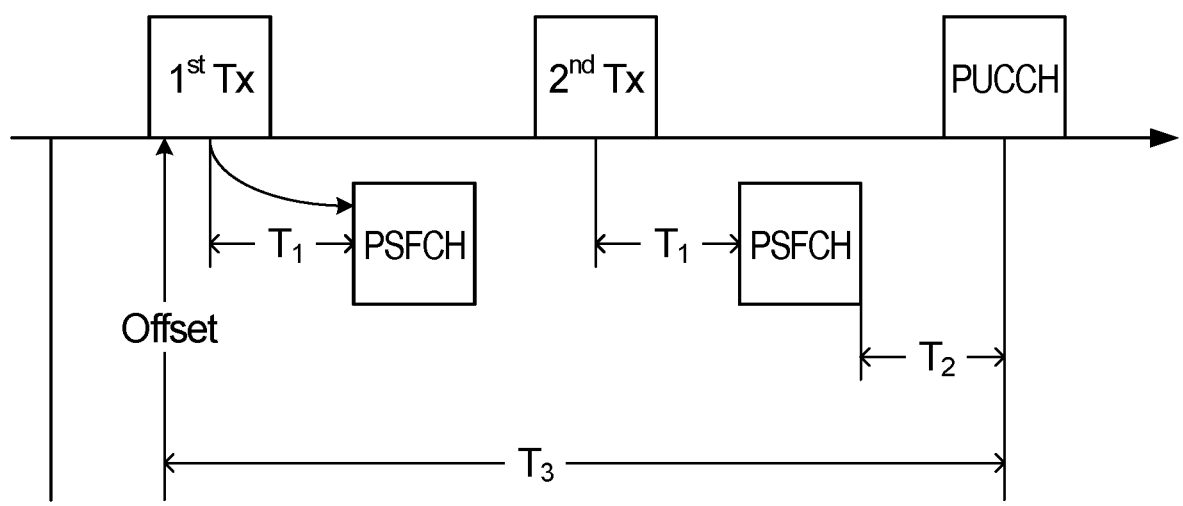
FIG. 9 is a schematic diagram illustrating an example relationship among transport blocks and control channels in the time domain.

An example of the relationship among data transmission and feedback and control channels for multiple transmissions of a TB is illustrated in FIG. 9. As depicted, the time slots for a first transmission of a TB ($1^{st}$ Tx), a second transmission of the TB ($2^{nd}$ Tx), PSFCH, and PUCCH are shown. In case of CG, an "offset" is indicated for CG resource configuration, which indicates the starting slot position for the first transmission with respect to a reference time. The time "$T_1$" represents the time period from a data transmission to PSFCH. The time "$T_2$" represents the time period from PSFCH to PUCCH. The total time from the offset time slot to PUCCH is indicated as "$T_3$". The resource for the first transmission (initial transmission) then periodically occurs based on the periodicity parameter configured for CG configuration.

In an embodiment suitable for CG type 1, the RRC may configure the PUCCH resources for the CG so that the PUCCH shares the same periodicity with the CG resource, and only a slot offset relative to the periodicity for CG is configured. This means that for each periodicity of CG configuration, only one (1), or a single, PUCCH is configured. Within one periodicity, there may be multiple resources configured for multiple transmissions or repetitions of a TB as shown in FIG. 9 (FIG. 9 shows only 1 periodicity).

In an embodiment, only the time gap from PSFCH to PUCCH, such as T2 shown in FIG. 9, is indicated. In case of K repetitions, although it may be possible to have multiple PSFCH resources corresponding to different repetitions, only one (1) PUCCH resource per period is configured, where the time gap corresponds to the PSFCH slot of the last repetition. Similarly, in the case of dynamic grant instead of configured grant, if the dynamic grant from the gNB indicates resources for K repetitions of a TB, the time gap from PSFCH to PUCCH, such as T2 shown in FIG. 9, is indicated. In case of K repetitions, although it may be possible to have multiple PSFCH resources corresponding to different repetitions, only one (1) PUCCH resource per period is configured, where the time gap corresponds to the PSFCH slot of the last repetition. Note that in case of dynamic grant, FIG. 9 can correspond to the repetition resources indicated in the dynamic grant downlink control information (DCI), however, the location of first transmission is not determined based on the offset with regard to SFN=0, but determined based on the location of DCI and gap between DCI and $1^{st}$ transmission time.

In another embodiment, the PUCCH may have a larger periodicity than the CG resource. For example, the periodicity is 3 times the periodicity of the CG resource, which means only one (1) PUCCH resource for 3 periodicity of CG resources and the UE only reports NACK to the base station, such as a gNB, after a given number of failed retransmissions. In this case, a NACK is only reported if a corresponding PUCCH exists.

Example embodiments are described that apply generally to any communication system where UEs reserve resources for SL communications based on resource availability.

The present disclosure provides examples in which resources is excluded based on a priority for a reservation type that is indicated in an indication signal, and resources is selected for a subsequent transmission based on determination result regarding whether resources reserved by the reservation type is exclude when selecting resources, which may enable the collision of resources used by different UEs to be reduced significantly. In some applications, the determination result may be obtained by calculating a priority value associated with the reservation type, and determine whether to exclude the resources reserved by the indicated reservation type based on the calculated priority value when performing resource selection. Moreover, because NR V2X supports resource reservations for blind retransmission of a TB, retransmission of future TBs, and feedback-based retransmissions, the method of taking the priorities of the different resources reservations into account provides flexibilities to exclude the resources that have been reserved, which may enable to resources to be selected more efficiently and more accurately.

The present disclosure further illustrates that a start point of a selection window is varied at any time point in a periodic resource pool. Moreover, the length (time duration) of the selection window is also variable.

Example embodiments of the disclosure also include the following numbered embodiments.

1. A method comprises:
  receiving from a first user equipment (UE), at a second UE, a signal comprising reservation information for selection and reservation of time-frequency resources associated with transmission of a first transport block (TB) by the first UE, the reservation information comprising reservation type information indicative of a type of the reservation selected from a plurality of predefined reservation types;
  selecting a time-frequency resource based on at least in part the reservation type indicated by the reservation type information;
  reserving the selected time-frequency resource for receiving retransmission of the first TB or transmission of a second TB by the first UE.

2. The method of embodiment 1, wherein the signal comprises an indication signal.

3. The method of embodiment 2, wherein the indication signal comprises first stage sidelink control information (SCI).

4. The method of any one of embodiments 1 to 3, wherein the plurality of predefined reservation types comprise type (a) associated with reservation of a sidelink resource for transmission of the second TB; type (b) associated with reservation of a sidelink resource for blind retransmission of the first TB; and type (c) associated with reservation of a sidelink resource for hybrid automatic repeat request (HARQ) feedback based retransmission of the first TB.

5. The method of embodiment 4, wherein reservation type (a) comprises type (a1) associated with long term reservation, type (a2) associated with reservation for transmission of a selected number of different TBs, and type (a3) associated with no reservation for the second TB.

6. The method of any one of embodiments 1 to 5, wherein the reservation
  information further comprises information indicating (i) a priority of a data packet in the first TB, or a quality of service (QOS) priority; (ii) an identifier of the time frequency resource to be reserved; (iii) a reservation periodicity (RSVP), or a time frequency repetition pattern (TFRP) periodicity; and (iv) a number of periodic resources to be reserved based on the RSVP or the TFRP periodicity.

7. The method of embodiment 6, wherein the identifier of the time and frequency resource to be reserved is a TFRP index.

8. The method of any one of embodiments 1 to 7, further comprising determining a reservation priority or threshold associated with the reservation based on, at least in part, the reservation type indicated in the reservation information; and selecting and reserving the time-frequency resource based on the reservation priority or threshold.

9. The method of embodiment 8 as dependent from embodiment 4, wherein the reservation priority associated with reservation type (b) is higher than the reservation priority associated with reservation type (c).

10. The method of embodiment 8 as dependent from embodiment 5, wherein the reservation priority associated with reservation type (a1) is lower than the reservation priority associated with reservation type (a2).

11. A method comprises:
  transmitting, from a first user equipment (UE) to a second UE, a signal comprising reservation information for selection and reservation of time-frequency resources associated with transmission of a first transport block (TB) by the first UE, the reservation information comprising reservation type information indicative of a type of the reservation selected from a plurality of predefined reservation types, to allow the second UE to select and reserve a time-frequency resource based on at least in part the reservation type indicated in the reservation information, for receiving the first TB, and for receiving retransmission of the first TB or transmission of a second TB by the first UE.

12. The method of embodiment 11, wherein the signal comprises an indication signal.

13. The method of embodiment 12, wherein the indication signal comprises first stage sidelink control information (SCI).

14. The method of any one of embodiments 11 to 13, wherein the plurality of predefined reservation types comprise a type (a) associated with reservation of a sidelink resource for transmission of the second TB; a type (b) associated with reservation of a sidelink resource for blind retransmission of the first TB; and a type (c) associated with reservation of a sidelink resource for hybrid automatic repeat request (HARQ) feedback based retransmission of the first TB.

15. The method of embodiment 14, wherein reservation type (a) comprises type (a1) associated with long term reservation, type (a2) associated with reservation for transmission of a selected number of different TBs, and type (a3) associated with no reservation for the second TB.

16. The method of any one of embodiments 11 to 15, wherein the reservation information further comprises information indicating (i) a priority of a data packet in the first TB, or a quality of service (QOS) priority; (ii) an identifier of a time frequency resource to be reserved; (iii) a reservation periodicity (RSVP), or a time frequency repetition pattern (TFRP) periodicity; and (iv) a number of periodic resources to be reserved based on the RSVP or the TFRP periodicity.

17. The method of embodiment 16, wherein the identifier of the time and frequency resource to be reserved is a TFRP index.

18. A user equipment (UE) comprises a transceiver and a processor, the UE being configured to perform the method of any one of embodiments 1 to 17.

19. A device comprises:
  a first transceiver configured to communicate with a second transceiver through a sidelink communication channel;
  wherein the device is configured to encode and transmit, or to receive and decode, a signal comprising reservation information for selection and reservation of time-frequency resources associated with transmission of a first transport block (TB) by a first user equipment (UE);

wherein the reservation information comprises reservation type information indicative of a type of the reservation selected from a plurality of predefined reservation types, to allow a second UE to select and reserve a time-frequency resource based on at least in part the reservation type indicated in the reservation information, for receiving retransmission of the first TB or transmission of a second TB by the first UE.

20. The device of embodiment 19, wherein the signal comprises an indication signal.

21. The device of embodiment 19 or embodiment 20, wherein the indication signal comprises first stage sidelink control information (SCI).

22. The device of any one of embodiments 19 to 21, wherein the plurality of reservation types comprise type (a) associated with reservation of a sidelink resource for transmission of the second TB; type (b) associated with reservation of a sidelink resource for blind retransmission of the first TB; and type (c) associated with reservation of a sidelink resource for hybrid automatic repeat request (HARQ) feedback based retransmission of the first TB.

23. The device of embodiment 22, wherein reservation type (a) comprises type (a1) associated with long term reservation, type (a2) associated with reservation for transmission of a selected number of different TBs, and type (a3) associated with no reservation for the second TB.

24. The device of any one of embodiments 19 to 23, wherein the device is further configured to determine a priority or threshold associated with the reservation based on, at least in part, the reservation type indicated in the reservation signal; and to select and reserve the time-frequency resource based on the priority or threshold.

25. The device of any one of embodiments 19 to 24, wherein the device is associated with or mounted on a vehicle.

26. An apparatus comprises:
an antenna;
a processor; and
a non-transitory computer readable storage medium storing processor executable instructions for execution by the processor, the processor executable instructions including instructions causing the apparatus to perform a method according to any one of embodiments 1 to 17.

27. A method comprises:
receiving, at a first user equipment (UE), signaling indicating whether, when transmitting a transport block (TB), reservation of time-frequency resources for a different TB is enabled or disabled;
transmitting, from the first UE to a second UE in a sidelink control channel (SCC), sidelink control information (SCI) signaling comprising indication of a first time-frequency resource for transmitting a first TB, the SCI further indicating (i) a reservation period (RSVP) and a sidelink resource to be reserved based on the RSVP when reservation of time-frequency resources for a different TB is enabled, or (ii) no reservation of a different TB without indicating the RSVP when reservation of time-frequency resources for a different TB is disabled;
transmitting the first TB from the first UE to the second UE using the sidelink resource indicated in the SCI signaling.

28. The method of embodiment 27, which comprises, when reservation of time-frequency resources for a different TB is enabled, transmitting, within the reservation period, a second TB from the first UE to the second UE using the sidelink resource indicated in the SCI signaling, wherein the second TB is different from the first TB.

29. The method of embodiment 27, wherein the SCC is a physical sidelink control channel (PSCCH).

30. The method of embodiment 27, wherein the SCI signaling is a first stage SCI signaling.

31. A method comprises:
receiving, from a first user equipment (UE), at a second UE, in a sidelink control channel (SCC), sidelink control information (SCI) signaling comprising indication of a first time-frequency resource for transmitting a first transport block (TB), the SCI further indicating (i) a reservation period (RSVP) and a sidelink resource to be reserved based on the RSVP when reservation of time-frequency resources for a different TB is enabled, or (ii) no reservation of a different TB without indicating the RSVP when reservation of time-frequency resources for a different TB is disabled;
receiving the first TB from the first UE at the second UE using the sidelink resource indicated in the SCI signaling.

32. The method of embodiment 31, which comprises, when reservation of time-frequency resources for a different TB is enabled, receiving, within the reservation period, at the second UE from the first UE, a second TB using the sidelink resource indicated in the SCI signaling, wherein the second TB is different from the first TB.

33. The method of embodiment 31, wherein the SCC is a physical sidelink control channel (PSCCH).

34. The method of embodiment 31, wherein the SCI signaling is a first stage SCI signaling.

35. A user equipment comprising a transceiver and a processor, being configured to perform the method of embodiment 27 or 31.

36. An apparatus comprising an antenna; a processor; and a non-transitory computer readable storage medium storing processor executable instructions for execution by the processor, the processor executable instructions including instructions causing the apparatus to perform a method according to embodiment 27 or 31.

37. A method comprises:
transmitting, from a first user equipment (UE), to second UE, in a sidelink control channel (SCC), sidelink control information (SCI) signaling for transmitting a transport block (TB), the SCI signaling comprising indication of a plurality of time-frequency resources, wherein time resources and frequency resources within the time-frequency resources are indicated separately and the time resources are indicated with a single time resource pattern index; transmitting the TB from the first UE to the second UE using a sidelink resource from the time-frequency resources indicated in the SCI signaling.

38. The method of embodiment 37, wherein the time resource pattern index indicates a time resource pattern for a number of retransmissions, wherein the combination of the number of retransmissions and the time resource pattern is a possible combination within a maximum time gap between a first transmission and a last transmission of the TB, and the time resource pattern index is capable of indicating any possible combination of any possible time resource pattern and any possible number of retransmission under a maximum number of retransmissions within the maximum time gap.

39. The method of embodiment 37, wherein the time resource pattern index indicates a total number of repetitions.

40. A method comprises:
receiving, from a first user equipment (UE), at a second UE, in a sidelink control channel (SCC), sidelink control information (SCI) signaling for transmitting a transport block (TB), the SCI signaling comprising indication of a plurality of time-frequency resources, wherein time resources and frequency resources within the time-frequency resources are indicated separately and the time resources are indicated with a single time resource pattern index; receiving, at the second UE, the TB from the first UE, using a sidelink resource selected and reserved based on the SCI signaling.

41. The method of embodiment 40, wherein the time resource pattern index indicates a time resource pattern for a number of retransmissions, wherein the combination of the number of retransmissions and the time resource pattern is a possible combination within a maximum time gap between a first transmission and a last transmission of the TB, and the time resource pattern index is capable of indicating any possible combination of any possible time resource pattern and any possible number of retransmission under a maximum number of retransmissions within the maximum time gap.

42. The method of embodiment 40, wherein the time resource pattern index indicates a total number of repetitions.

43. A user equipment comprises a transceiver and a processor, and is configured to perform the method of embodiment 37 or embodiment 40.

44. An apparatus comprises an antenna; a processor; and a non-transitory computer readable storage medium storing processor executable instructions for execution by the processor, the processor executable instructions including instructions causing the apparatus to perform a method according to embodiment 37 or 40.

Although the present disclosure describes methods and processes with action in a certain order, one or more actions of the methods and processes may be omitted or altered as appropriate. One or more actions may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may include a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

It should be appreciated that one or more steps of the embodiment methods provided herein may be performed by corresponding units or modules. For example, a packet may be transmitted by a transmitting unit or a transmitting module. A packet may be received by a receiving unit or a receiving module. A packet may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

This disclosure has been described with reference to illustrative embodiments, but this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:
1. A method comprising:
transmitting, from a first user equipment (UE), to a second UE, in a sidelink control channel (SCC), sidelink control information (SCI) signaling for transmitting a transport block (TB), the SCI signaling comprising indication of a plurality of time-frequency resources, wherein time resources and frequency resources within the time-frequency resources are indicated separately and independently in the SCI signaling, and wherein the time resources comprise multiple time resources reserved for multiple transmissions of the same TB and are indicated with a single time resource pattern index; and
transmitting the TB from the first UE to the second UE using a sidelink resource from the time-frequency resources indicated in the SCI signaling.

2. The method of claim 1, wherein the time resource pattern index indicates a time resource pattern for a number of retransmissions, wherein the combination of the number of retransmissions and the time resource pattern is a possible combination within a maximum time gap between a first transmission and a last transmission of the TB.

3. The method of claim 2, wherein the time resource pattern index is capable of indicating any possible combination of any possible time resource pattern and any possible number of retransmission under a maximum number of retransmissions within the maximum time gap.

4. The method of claim 1, wherein the time resource pattern index indicates a total number of repetitions.

5. A user equipment comprising a transceiver and a processor, being configured to perform the method of claim 1.

6. The user equipment of claim 5, wherein the time resource pattern index indicates a time resource pattern for a number of retransmissions, wherein the combination of the number of retransmissions and the time resource pattern is a possible combination within a maximum time gap between a first transmission and a last transmission of the TB.

7. The user equipment of claim 6, wherein the time resource pattern index is capable of indicating any possible combination of any possible time resource pattern and any possible number of retransmission under a maximum number of retransmissions within the maximum time gap.

8. The user equipment of claim 5, wherein the time resource pattern index indicates a total number of repetitions.

9. A non-transitory computer readable storage medium storing processor executable instructions for execution by a processor, the processor executable instructions including instructions, when executed by the processor, causing performance of the method of claim 1.

10. The storage medium of claim 9, wherein the time resource pattern index indicates a time resource pattern for a number of retransmissions, wherein the combination of the number of retransmissions and the time resource pattern is a possible combination within a maximum time gap between a first transmission and a last transmission of the TB.

11. The storage medium of claim 10, wherein the time resource pattern index is capable of indicating any possible combination of any possible time resource pattern and any possible number of retransmission under a maximum number of retransmissions within the maximum time gap.

12. The storage medium of claim 9, wherein the time resource pattern index indicates a total number of repetitions.

13. An apparatus comprising an antenna; a processor; and a non-transitory computer readable storage medium storing processor executable instructions for execution by the processor, the processor executable instructions including instructions, when executed by the processor, causing the apparatus to perform the method of claim 1.

14. The apparatus of claim 13, wherein the time resource pattern index indicates a time resource pattern for a number of retransmissions, wherein the combination of the number of retransmissions and the time resource pattern is a possible combination within a maximum time gap between a first transmission and a last transmission of the TB.

15. The apparatus of claim 14, wherein the time resource pattern index is capable of indicating any possible combination of any possible time resource pattern and any possible number of retransmission under a maximum number of retransmissions within the maximum time gap.

16. The apparatus of claim 13, wherein the time resource pattern index indicates a total number of repetitions.

17. A method comprising:
receiving, at a second UE from a first user equipment (UE), in a sidelink control channel (SCC), sidelink control information (SCI) signaling for transmitting a transport block (TB), the SCI signaling comprising indication of a plurality of time-frequency resources, wherein time resources and frequency resources within the time-frequency resources are indicated separately and independently in the SCI signaling, and wherein the time resources comprise multiple time resources reserved for multiple transmissions of the same TB and are indicated with a single time resource pattern index; and
receiving, at the second UE, the TB from the first UE, using a sidelink resource selected and reserved based on the SCI signaling.

18. The method of claim 17, wherein the time resource pattern index indicates a time resource pattern for a number of retransmissions, wherein the combination of the number of retransmissions and the time resource pattern is a possible combination within a maximum time gap between a first transmission and a last transmission of the TB.

19. The method of claim 18, wherein the time resource pattern index is capable of indicating any possible combination of any possible time resource pattern and any possible number of retransmission under a maximum number of retransmissions within the maximum time gap.

20. The method of claim 17, wherein the time resource pattern index indicates a total number of repetitions.

21. A user equipment comprising a transceiver and a processor, being configured to perform the method of claim 17.

22. The user equipment of claim 21, wherein the time resource pattern index indicates a time resource pattern for a number of retransmissions, wherein the combination of the number of retransmissions and the time resource pattern is a possible combination within a maximum time gap between a first transmission and a last transmission of the TB.

23. The user equipment of claim 22, wherein the time resource pattern index is capable of indicating any possible combination of any possible time resource pattern and any possible number of retransmission under a maximum number of retransmissions within the maximum time gap.

24. The user equipment of claim 21, wherein the time resource pattern index indicates a total number of repetitions.

25. An apparatus comprising an antenna; a processor; and a non-transitory computer readable storage medium storing processor executable instructions for execution by the processor, the processor executable instructions including instructions, when executed by the processor, causing the apparatus to perform the method of claim 18.

26. The apparatus of claim 25, wherein the time resource pattern index indicates a time resource pattern for a number of retransmissions, wherein the combination of the number of retransmissions and the time resource pattern is a possible combination within a maximum time gap between a first transmission and a last transmission of the TB.

27. The apparatus of claim 26, wherein the time resource pattern index is capable of indicating any possible combination of any possible time resource pattern and any possible number of retransmission under a maximum number of retransmissions within the maximum time gap.

28. The apparatus of claim 25, wherein the time resource pattern index indicates a total number of repetitions.

29. A non-transitory computer readable storage medium storing processor executable instructions for execution by a processor, the processor executable instructions including instructions, when executed by the processor, causing performance of the method of claim 17.

30. The storage medium of claim 29, wherein the time resource pattern index indicates a time resource pattern for a number of retransmissions, wherein the combination of the number of retransmissions and the time resource pattern is a possible combination within a maximum time gap between a first transmission and a last transmission of the TB.

31. The storage medium of claim 30, wherein the time resource pattern index is capable of indicating any possible combination of any possible time resource pattern and any possible number of retransmission under a maximum number of retransmissions within the maximum time gap.

32. The storage medium of claim 29, wherein the time resource pattern index indicates a total number of repetitions.

* * * * *